United States Patent
Ichii et al.

(10) Patent No.: US 8,085,457 B2
(45) Date of Patent: Dec. 27, 2011

(54) LIGHT SOURCE SYSTEM, OPTICAL SCANNER, IMAGE FORMING APPARATUS, AND LIGHT-AMOUNT CONTROL METHOD

(75) Inventors: Daisuke Ichii, Kanagawa (JP); Kenichi Takanashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 433 days.

(21) Appl. No.: 11/736,313

(22) Filed: Apr. 17, 2007

(65) Prior Publication Data

US 2007/0253047 A1 Nov. 1, 2007

(30) Foreign Application Priority Data

Apr. 27, 2006 (JP) ................. 2006-124127

(51) Int. Cl.
G02B 26/08 (2006.01)
(52) U.S. Cl. ................................... 359/212.1
(58) Field of Classification Search ............. 359/212.1, 359/196.1–226.3; 250/204, 559.06, 559.29, 250/230, 234
See application file for complete search history.

(56) References Cited

U.S. PATENT DOCUMENTS

| | | | |
|---|---|---|---|
| 4,192,573 A | 3/1980 | Brown, Jr. | |
| 4,638,456 A | 1/1987 | Elias et al. | |
| 5,161,238 A | 11/1992 | Mehmke | |
| 5,369,511 A * | 11/1994 | Amos | 359/15 |
| 5,844,707 A * | 12/1998 | Minakuchi et al. | 359/204.1 |
| 2004/0264881 A1 | 12/2004 | Posamentier | |
| 2006/0071150 A1 * | 4/2006 | Aizpuru | 250/214.1 |
| 2006/0285187 A1 | 12/2006 | Ichii et al. | |

FOREIGN PATENT DOCUMENTS

| | | |
|---|---|---|
| EP | 0 143 743 A1 | 6/1985 |
| EP | 0 269 122 A2 | 6/1988 |
| EP | 0 713 112 A1 | 5/1996 |
| EP | 1 434 161 A1 | 6/2004 |
| JP | 59-223187 | 12/1984 |
| JP | 6-106775 | 4/1994 |
| JP | 6-164070 | 6/1994 |
| JP | 10-100476 | 4/1998 |
| JP | 2001-4942 | 1/2001 |
| JP | 3227226 | 8/2001 |
| JP | 2002-26445 | 1/2002 |
| JP | 2002-280655 | 9/2002 |
| JP | 2003-60299 | 2/2003 |
| JP | 2005-156933 | 6/2005 |
| JP | 2005-274678 | 10/2005 |

OTHER PUBLICATIONS

U.S. Appl. No. 12/190,182, filed Aug. 12, 2008, Ichii et al.
U.S. Appl. No. 12/031,362, filed Feb. 14, 2008, Arai, et al.

* cited by examiner

*Primary Examiner* — Jennifer L. Doak
(74) *Attorney, Agent, or Firm* — Oblon, Spivak, McClelland, Maier & Neustadt, L.L.P.

(57) ABSTRACT

A light source system includes a splitter that split light beams F0 emitted from a light source into at least light beams FM and light beams FS, and an optical detecting system that guides the light beams FM to a detector. A light component near a light-intensity peak of the light beams F0 in a plane perpendicular to a propagation direction of the light beams F0 is included only in the light beams FS. Accordingly, light beams have a substantially circular or elliptic cross section with the intensity peak near the center. Light at the peak is supplied to the outside, and other light is used to control an amount of light.

25 Claims, 19 Drawing Sheets

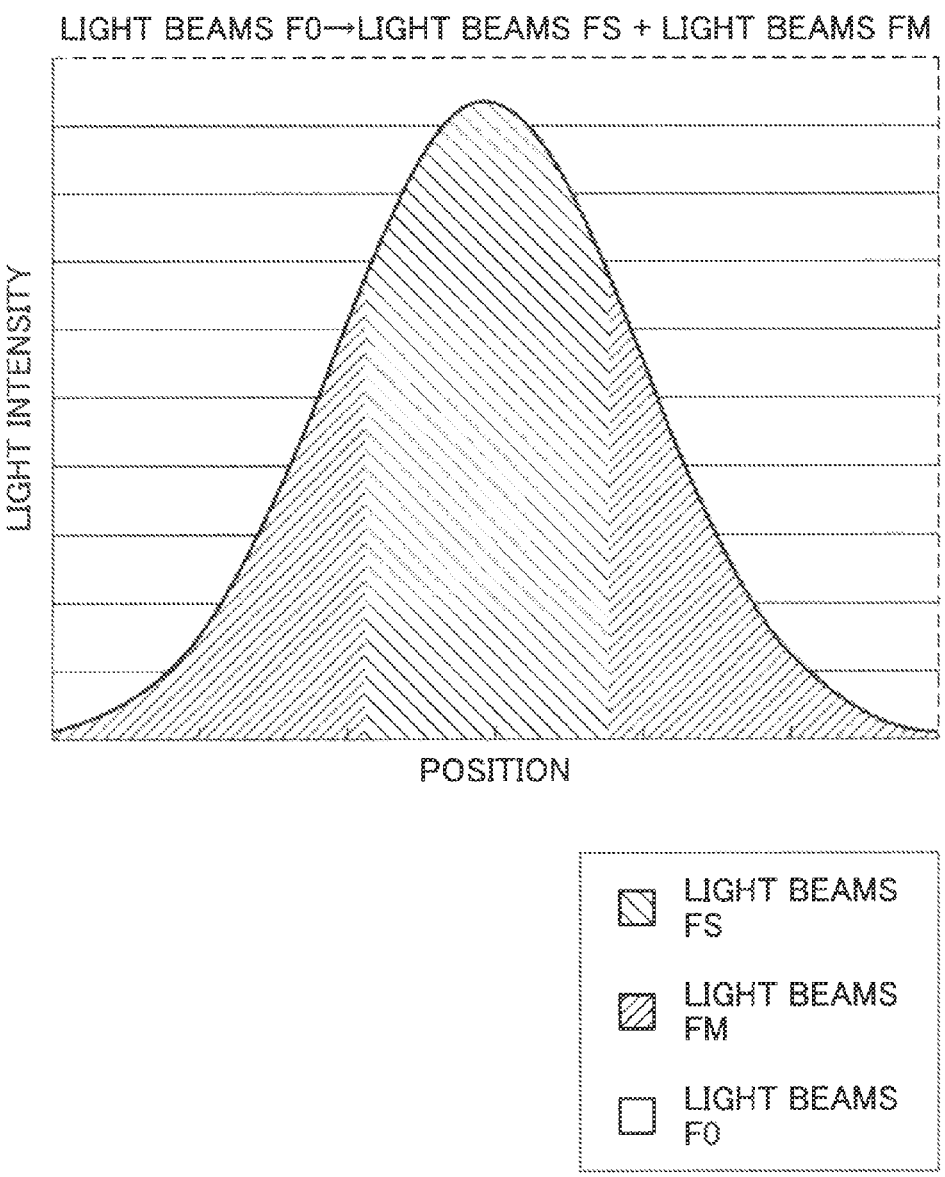

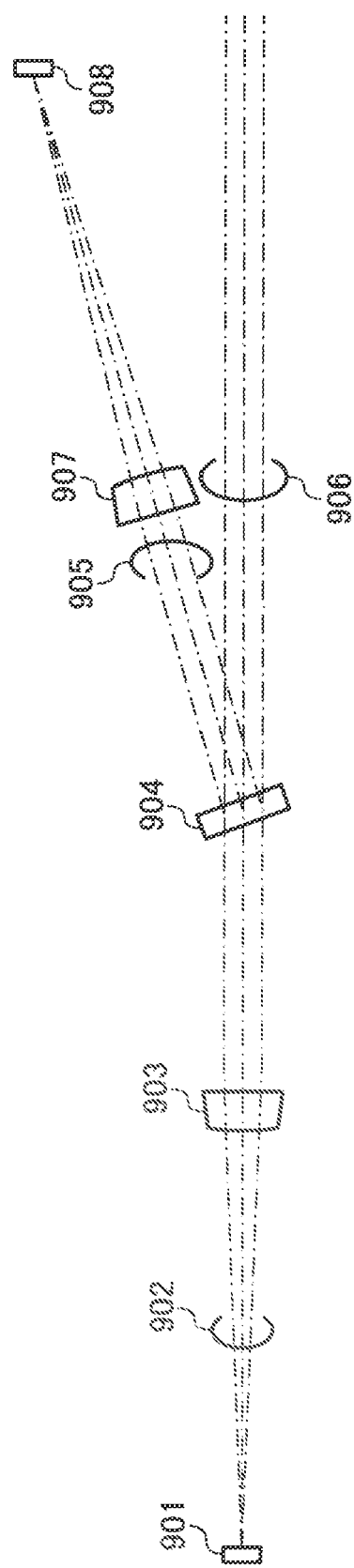

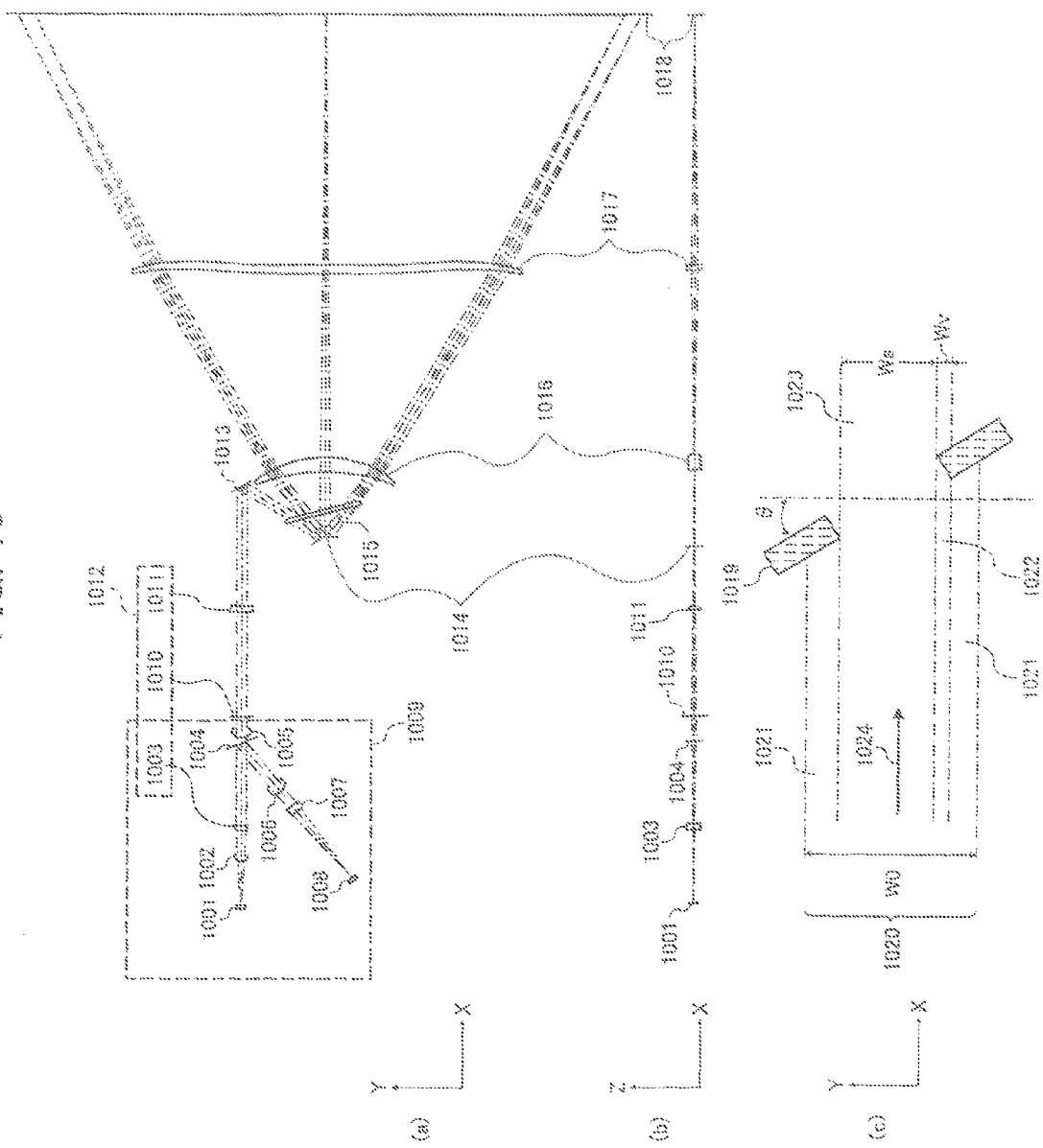

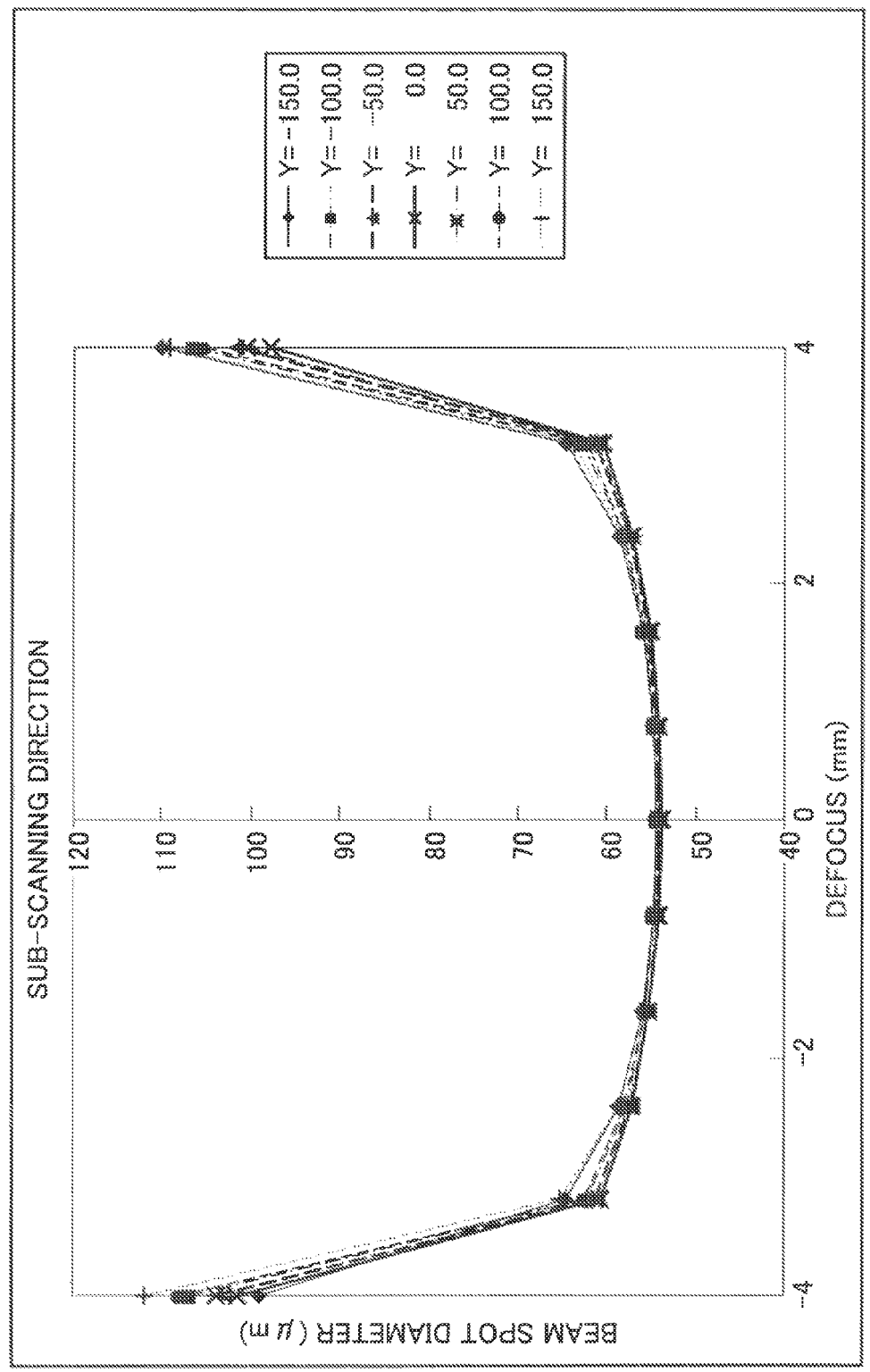

LIGHT SOURCE SYSTEM, OPTICAL SCANNER, IMAGE FORMING APPARATUS, AND LIGHT-AMOUNT CONTROL METHOD

CROSS-REFERENCE TO RELATED APPLICATIONS

The present document incorporates by reference the entire contents of Japanese priority document, 2006-124127 filed in Japan on Apr. 27, 2006.

BACKGROUND OF THE INVENTION

1. Field of the Invention

The present invention relates to a light source system, an optical scanner, an image forming apparatus, and a light-amount control method.

2. Description of the Related Art

A raster output scanner having a light source such as a surface-emitting laser to emit a number of light beams has been proposed. For example, Japanese Patent Application Laid-open No. H10-100476 discloses a raster scanner that uses a semitransparent and semi-reflecting member as a photo-detector to reflect light emitted from the light source.

Besides, for example, Japanese Patent Application Laid-open No. 2002-26445 discloses a light source device of a type using a surface-emitting semiconductor laser, having a light-receiving surface placed on a substrate of the semiconductor laser. The device detects an amount of emitted light with a splitter that splits a traveling path of light beams emitted from the semiconductor laser into a plurality of paths so that the light beams pass through the light-receiving surface.

Japanese Patent Application Laid-open No. 2005-274678 discloses an optical scanner having a plurality of light emitting points, an optical unit that collimates light beams, and a beam reflecting member that transmits a portion of the light beams therethrough and reflects another portion of the light beams therefrom. The optical scanner detects a light amount pertaining to even a light source that has no back beams. In the optical scanner, a unit that detects the light amount and the light source are disposed on a single base member to miniaturize the optical scanner.

Japanese Patent Application Laid-open No. H06-164070 discloses a light source device provided with an aperture for shaping light beams emitted from a semiconductor laser having a plurality of linearly-aligned light emitting sources, and a plurality of light receiving elements corresponding to the light emitting sources, which receive detecting light beams reflected from a mirror surface provided on the aperture.

Japanese Patent No. 3227226 discloses a technology related to a positional relationship between a scanning line provided by a surface emitting laser and an image-forming spot to thereby attain high-speed scanning.

In recent years, there are increasing demands for an image forming apparatus of higher speed, higher density, and higher image quality. In response to the demands, an image forming apparatus that uses a multi-beam image-forming system having a plurality of light emitting points to scan a single scanning surface with a plurality of beams has been put into practice.

Optical scanners, particularly laser scanners employing a semiconductor laser are advantageous in simple structure, high speed performance, and high resolution, and are therefore in wide use as image forming apparatuses, such as an image display apparatus and an image recording apparatus. Particularly, the optical scanner is suitably used for an exposure device of an electrophotographic printer, and many products are currently on the market as laser printers.

Meanwhile, in recent years, demands for a higher image scanning speed and higher resolution of an image forming apparatus have been increased, and an increase of a scanning speed has been desired. While a high-speed deflector is necessary to attain high-speed scanning, when, for example, a rotary polygon mirror is employed as the deflector, a problem that the rotation velocity has an upper limit arises.

As a solution for this problem, Japanese Patent No. 3227226 proposes an image forming apparatus that uses a so-called multi-beam scanner. The scanner scans with light beams emitted from a vertical cavity surface emitting laser (VCSEL) having a plurality of independently-controllable light emitting points, and performs scanning with a plurality of scanning lines simultaneously in a single scanning operation.

FIG. 1 is an example of a conventional optical scanner using a VCSEL having such a plurality of light emitting areas.

A light source 101 has a plurality of light emitting areas and a light emission controller for controlling the light emitting areas. A plurality of laser beams are emitted from the light source 101, and coupled to be shaped through a coupling optical unit formed with a coupling lens 102 and a cylindrical lens 103. The thus-coupled beams are deflectively reflected from a deflector 105, which is a rotary polygon mirror, and subjected to scanning in a main scanning direction. Hence, the beams forms a scanning line 109 on a scanning surface (photosensitive member) 108, which is an image surface, through an image-forming optical unit formed with a first scanning lens (106a) and a second scanning lens (106b). In this example, a cylindrical image carrier supporting a photosensitive medium is used as the scanning surface 108.

The image carrier rotates about an axis of the cylinder shown in FIG. 1 to move the image surface in the direction perpendicular to the main scanning direction, thereby performing optical scanning to form an image.

To achieve image forming at higher speed, utilization of multiple beams by employing the VCSEL or the like is conceivable. It is particularly common for a high-speed image-output apparatus to adopt a multi-beam light source for image forming.

When "n" laser beams are simultaneously used, an area on which a latent image is formed is increased by a factor of "n" as compared to that with a single laser beam, and a necessary period of time for image forming is decreased by the same factor "n". A problem with performing optical scanning and image forming using a plurality of light beams is how to cause the light beams to have little difference in light intensity. This is because, when each light beam has different light intensity, densities of scanning lines differ from a scanning line to another, which results in degradation in image quality. To this end, each of Japanese Patent Application Laid-open Nos. H10-100476, 2002-26445, and 2005-274678 describes a light source or an optical scanner using a VCSEL, which detects a light intensity of each light beam with a light receiving surface and controls light emitting devices with a control circuit based on data on the detected value to attain a desired optical intensity.

To achieve image forming at higher speed, the laser is required to have an increased output power in addition to adopting the multi-beam method. The reason for this requirement is as follows. In an electrophotographic image-forming apparatus, an exposure energy exceeding a required amount per unit area and unit time must be provided on a photosensitive member, which functions as the scanning surface. Accordingly, a greater optical power or an increase in efficiency for light utilization is required to increase a linear velocity (moving speed of the surface of the photosensitive member) of the photosensitive member to thereby achieve a higher speed. While attempts to increase an optical power have been made through development of VCSEL elements, a ratio of the increase achieved so far is small. Hence, it is essential to increase the light utilization efficiency of a light source apparatus, a light source system, and an optical scanner to perform image forming at high density and high speed.

Meanwhile, Japanese Patent Application Laid-open Nos. H10-100476, 2002-26445, 2005-274678, and H06-164070 do not or hardly suggest enhancement of efficiency for light utilization.

With the technology described in Japanese Patent Application Laid-open No. H10-100476, if a so-called half mirror is used, a loss entailed in supplying light to the outside is large.

According to the technology described in Japanese Patent Application Laid-open No. 2002-26445, a light receiving surface for detecting the light amount is mounted in a light source apparatus. Hence, the optical path between the light source and the light receiving surface is reduced in length, which allows highly accurate detection of the light amount and image forming of high quality. However, a triangular prism or the like employed as the splitter produces a great loss of light in supplying light to the outside. Increasing the optical output power is the currently imposed requirement on the surface emitting laser. However, a solution for the requirement has not been disclosed yet.

According to the technology described in Japanese Patent Application Laid-open No. 2005-274678, optical scanning and image forming are carried out using a portion of light beams having passed through a beam returning member. Therefore, when a surface emitting laser, of which optical output power are to be increased, is employed as the light source, a loss in light amount exceeds a negligible amount and hence poses a problem to increase the speed.

The technology described in Japanese Patent Application Laid-open No. H06-164070 does not clarify positional relationships among a mirror surface, an aperture member, and light beams to be subjected to splitting for detecting a light amount. Hence, a great amount of light is to be lost, which is a problem for forming an image at high speed. In addition, provision of a plurality of light receiving elements is a problem for cost reduction of the apparatus.

SUMMARY OF THE INVENTION

It is an object of the present invention to at least partially solve the problems in the conventional technology.

According to an aspect of the present invention, a light source system with at least one light source controls an amount of light from the light source, and includes a detector that detects light intensity of a first light bundle emitted from the light source, a splitter that splits the first light bundle into at least a second light bundle and a third light bundle such that a light component near a peak of the light intensity in a plane perpendicular to a propagation direction of the first light bundle is included only in the third light bundle, and an optical detecting system that guides the second light bundle to the detector.

According to another aspect of the present invention, a light-amount control method for controlling an amount of light from at least one light source, includes detecting, by a detector, light intensity of a first light bundle emitted from the light source, splitting the first light bundle into at least a second light bundle and a third light bundle such that a light component near a peak of the light intensity in a plane perpendicular to a propagation direction of the first light bundle is included only in the third light bundle, and guiding the second light bundle to the detector.

According to still another aspect of the present invention, an image forming apparatus includes an optical scanner that includes a light source system that includes at least one light source and controls an amount of light from the light source, a beam shaper that includes an aperture to shape light beams emitted from the light source system, a deflector that deflects and scans the light beams in a main scanning direction, and an optical scanning unit that focuses the light beams on a scanning surface to form an image. The light source system includes a detector that detects light intensity of a first light bundle emitted from the light source, a splitter that splits the first light bundle into at least a second light bundle and a third light bundle such that a light component near a peak of the light intensity in a plane perpendicular to a propagation direction of the first light bundle is included only in the third light bundle, and an optical detecting system that guides the second light bundle to the detector.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a graph of a relation among the light beams F0, the light beams FS, and the light beams FM, in which the horizontal axis represents a position coordinate and the vertical axis represents light intensity;

FIG. 9 is a schematic of a light source system according to still another embodiment of the present invention;

FIG. 10 is a schematic of an example of an optical scanner using the light source system; (a) is a plan view, (b) is a side view, and (c) is an enlarged view of a portion near the splitter of the light source system in a main scanning plane;

FIG. 11B is a graph of optical characteristic curves for an image height Y ranging from +150 to −150 corresponding to a sub-scanning direction with a focal depth of 5.2 millimeters;

DETAILED DESCRIPTION OF THE PREFERRED EMBODIMENTS

Figure 1:
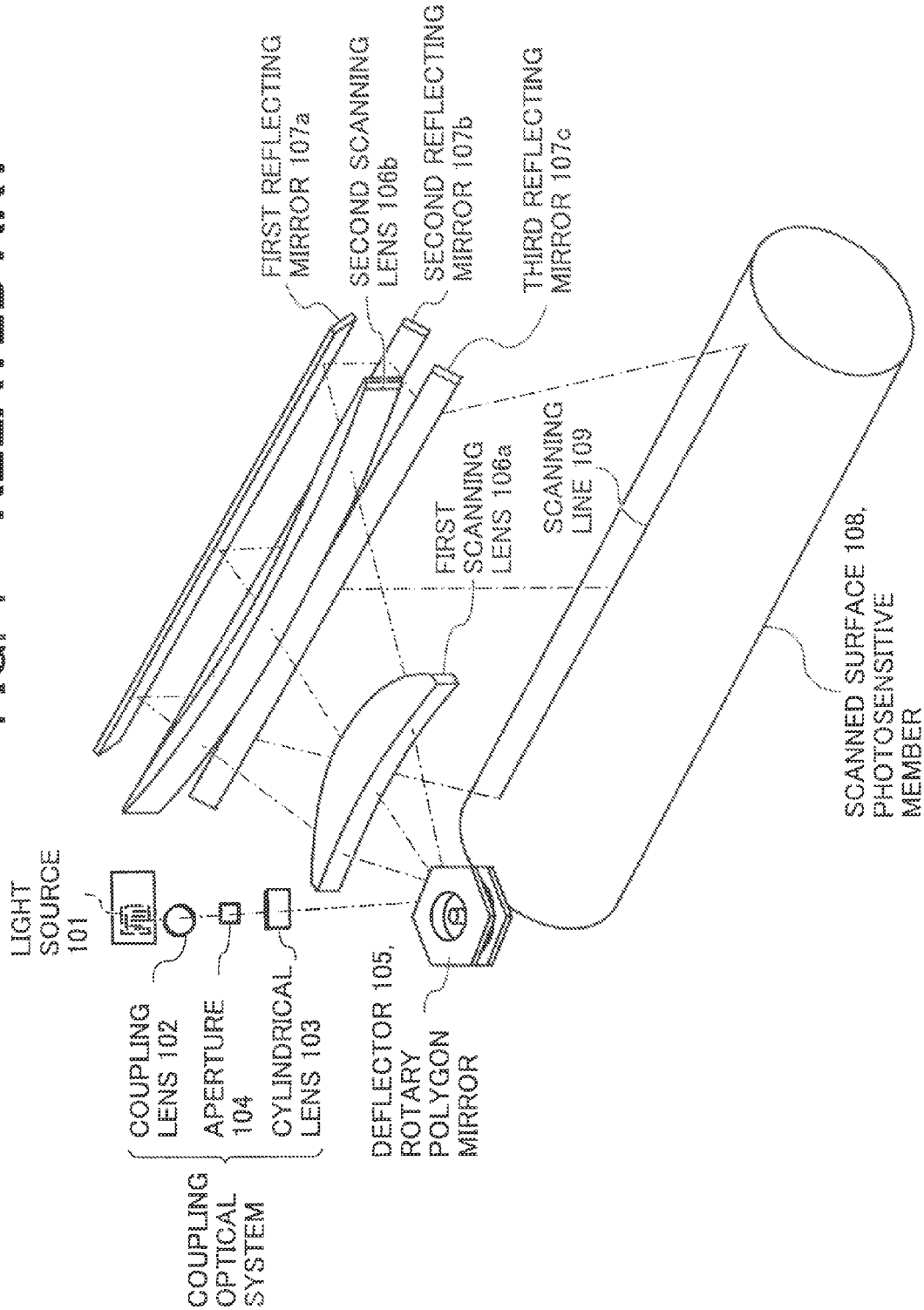
FIG. 1 is an example of a conventional optical scanner using a VCSEL.

Exemplary embodiments of the present invention are explained in detail below with reference to the accompanying drawings.

A light source system according to an embodiment of the present invention is capable of controlling a light amount by detecting light intensities of a plurality of light beams F0 emitted from at least one light source with a common detector. The system includes a splitter that splits the light beams F0 into at least light beams FM and light beams FS; and an optical detecting unit that guides the light beams FM to the detector. Light components near a light-intensity peak point of the light beams F0 on a cross section perpendicular to a propagation direction of the light beams F0 are included only in the light beams FS rather than in the light beams FM.

According to this configuration, the light beams have a substantially circular or elliptic cross section with its intensity peak near the center. Light in the peak portion is supplied to the outside, and light in the remaining portion is detected for control of a light amount. This enables control of the light amount and efficient supply of light to the outside. Efficiency for light utilization is thus increased, and energy saving and reduction of environmental load are attained.

Thus, the light source system that allows a light amount to be adjusted to a desired value appropriately and supply light of a sufficient amount to the outside is provided.

The light source system can further include driving circuitry a portion of which is formed integrally with the detector. The driving circuitry drives the light source.

According to this configuration, a light receiving element or the like, which functions as the detector, and the light source are supported on a single substrate or a single base member. Therefore, a necessary footprint can be reduced as compared with a configuration in which the detector and the light source are independently formed, and hence miniaturization of the system and an apparatus using the system are attained. In addition, a wiring board, a support member, and the like can be used partially in a shared manner. This reduces the number of components and thereby reduces cost and environmental load.

Thus, the system and the apparatus are miniaturized, enhanced in stability of light amount control against external noise, and reduced in the number of components and cost.

The light source system can include a light reflecting member as the splitter.

According to this configuration, using a light reflecting member such as a mirror as the splitter allows light to be supplied to the detector and/or to the outside highly efficiently with low loss. In addition, the system can be miniaturized because an optical path can be bent using a mirror.

Accordingly, even when emitted light is small in amount, the light can be detected highly efficiently and supplied at high output power. This leads to miniaturization of the system.

The light source system can include a curved mirror having a positive focal power as the splitter.

This configuration allows the splitter to converge light on the detector to thereby function also as the optical detecting unit. This eliminates the need of forming the optical detecting unit with another component, and reduces the number of components. The reduction in the number of components also reduces the footprint for devices, and hence miniaturizes the apparatus.

Thus, reduction in the number of components and cost is attained.

The light source system can include a light transmitting member as the splitter.

According to this configuration, when a lens or a prism, being a transparent optical element, or a diffracting optical element is employed, a positional deviation of a beam spot can be reduced because light beams are insusceptible to a surface shape of the element in contrast to a surface shape of a reflecting optical element such as a mirror. Hence, miniaturization of the light receiving element is attained. In addition, having a sufficient allowance in accuracy of the surface shape improves a yield rate and reduces the cost of the system.

As a result, miniaturization of the detector such as the light receiving element, improving a manufacturing yield rate, and cost reduction are attained.

The light source system can include an optical element having a focal length that reaches a point between the light source and the splitter. The splitter is positioned near a rear focal point of the optical element in an optical axis direction of the optical element.

According to this configuration, when a plurality of light beams are used, cross sections of out-of-optical-axis light beams that do not intersect an optical axis of an optical system such as a lens and therefore are at different distances from the optical axis generally do not spatially coincide with one another. When a portion of the light beams is clipped through a single opening, portions corresponding to different areas in light intensity distribution are subjected to detection. Consequently, the light beams undesirably differ from one another in light amount. However, on a focal point of a lens, even chief rays of light beams out of the optical axis intersect with the optical axis, which allows intensity centers of the light beams to align. When the light beams are split through a single splitter at this point, a ratio of a split light amount to a total light amount for each light beam becomes uniform through the light beams. Hence, a light amount controls can be performed uniformly on the plurality of light beams.

Therefore, when a plurality of light beams is used, the light beams are substantially identical in ratio, which is a ratio of a portion of light that reaches the detector to the light. Hence, each light beam is allowed to have a highly-accurately uniform amount of light on the detector.

The light source system can include a VCSEL as the light source.

According to this configuration, when the VCSEL is used, in contrast to an LD array that uses a plurality of edge-emitting semiconductor laser diodes, as the number of light beams to be emitted increases, the cost is reduced by a greater amount. Meanwhile, the VCSEL has a considerably short cavity length and therefore has a smaller mode hopping than that of the LD array. This reduces degradation in optical scanning quality due to variations in wavelength.

Hence, cost reduction of the light source system, and miniaturization of the apparatus by integrating the light emitting elements at high density are attained.

An optical scanner according to an embodiment of the present invention includes the light source system as described above; a beam shaper that shapes the plurality of light source system emitted from the light source system; a deflector that deflects the shaped light beams for scanning in a main scanning direction; and an optical scanning unit that causes the light beams deflected for scanning to form an image on a scanning surface. The beam shaper has an aperture member through which the light beams FS originated from the light source are shaped.

According to this configuration, employment of the light source system allows to adjust a light amount to a desired value while performing optical scanning. The efficiency in light utilization is also enhanced, which leads to energy saving and reduction of environmental load.

Thus, the optical scanner that allows to increase the efficiency for light utilization, reduce light amount requirement, and, even when a low-output light source is used, detect a light amount as well as perform optical scanning with a sufficient light amount is provided.

The optical scanner can includes the splitter that is arranged such that the light beams FS and the light beams FM form an angle only in a plane substantially perpendicular to a direction along which a smaller one of a main-scanning direction width and a sub-scanning direction width of an opening in the aperture member extends.

According to this configuration, when the light beams are to be shaped through the opening in the aperture member, vignetting of a miniscule number of light beams undesirably occurs at edges of the opening; that is, at a boundary between a light-beam passing portion and a light-beam intercepting portion, due to a limit in machining accuracy. However, the influence of this vignetting is considerably small because a typical aperture member is arranged perpendicular to a traveling direction of the light beams.

On the contrary, a member, such as in the splitter and/or the aperture member of the embodiment, that is arranged obliquely to the traveling direction of the light beams rather than perpendicularly is included, vignetting of light beams occurs depending on the thickness of the member. As an angle of the light beams increases with respect to a plane perpendicular to the light beam traveling direction, the amount of the light beams subjected to vignetting increases, and the apparatus becomes more susceptible to a dimensional error and a positional error that have occurred during manufacturing. Even when the same amount of light beams are subjected to vignetting, the larger the opening width, the less influence the vignetting exerts in terms of a ratio. Hence, beam-spot diameter variations on an image surface that are dependent on the opening can be reduced.

Therefore, the splitter and/or the aperture member is desirably disposed to be rotated about its rotary axis perpendicular to a direction along which longer widths of the opening extend.

The configuration allows, even when a surface of the splitter forms an angle with the traveling direction of the light beams F0, to reduce the amount of the light beams subjected to vignetting. Hence, variations of the beam spots in diameter, which is determined by the opening, due to a dimensional error occurred during manufacturing (hereinafter, "manufacturing error") are reduced. As for the layout, an optical image-forming system that includes the optical scanning unit and the light source system are housed in an optical housing to form the optical scanner. In the layout, generally, a lid of the optical housing is substantially parallel with a main scanning plane. Accordingly, an optical element disposed in the optical housing such that the light beams FS and FM in the light source system are substantially collimated with the main scanning plane is facilitated to receive arrangement and adjustment works in a state with the lid of the optical housing removed. Thus, a reduction in a manufacturing yield rate is prevented, which increases a manufacturing speed. In addition, positional adjustment of components such as the light receiving element and the optical element; e.g., the splitter, is facilitated. This allows the light beams FM to be guided to the light receiving element without fail as well as decrease a required size of the light receiving element, which leads to cost reduction. In addition, reduction of the thickness of the entire optical housing in the sub-scanning direction is attained, which allows miniaturization of the optical scanner.

Consequently, reduction of the beam spot diameter and influences on the light amount exerted by the manufacturing error is attained.

The optical scanner can include the splitter that performs splitting such that the light beams FM and the light beams FS form an angle in a plane parallel to a sub-scanning plane that is perpendicular to a main scanning plane.

According to this configuration, when arrangement of each component that forms the light source system in the main scanning plane is considerably restricted (by, e.g., interference between the component and the optical scanning unit or the optical housing), the interference can be avoided by distributing light beams in the sub-scanning direction. Even when a stray light is generated by any one of the optical elements in the light source system, it is possible to cause the stray light to less easily reach the scanning surface. For example, light reflected from a surface of a lens that converges light to the light receiving element has an angle in the sub-scanning direction. Therefore, the reflected light does not reach a light deflector (e.g., polygon mirror). Even when the reflected light in directly incident on a scanning lens, the light is deviated from regular scanning light beams in the sub-scanning direction on the way to the scanning surface, and does not reach the scanning surface. This reduces ghost.

Thus, the optical scanner is miniaturized by increasing layout flexibility of the light source system. In addition, a reflected, scattered, diffracted component of the light beams FM in the light source system enters the optical scanning unit as the stray light and reaches the scanning surface, thereby preventing ghost.

The optical scanner can include the aperture member and the splitter that are integrally formed.

According to this configuration, the member functioning as the aperture member is processed to have the function as the splitter, thereby integrating the two functions into the single member to reduce cost. This also reduces the footprint and hence miniaturizes the apparatus.

Thus, the number of the components is reduced, a manufacturing process is simplified, and cost is reduced.

The optical scanner can include the aperture member and the splitter, which are separate members, in the traveling direction of the light beams. The splitter is disposed upstream from the aperture member.

According to this configuration, the aperture member and the splitter are configured as separate members, which facilitates manufacturing of them, and hence increases a manufacturing yield rate. In addition, disposing the splitter upstream from the aperture member to be closer to the light source shortens the optical path from the light source to the detector. This leads to miniaturization of the apparatus, and, even when the apparatus has a manufacturing error, deviation of the beam spot on the detector can be reduced.

Thus, the apparatus is miniaturized and facilitated in manufacturing of the components.

The optical scanner can include the splitter clips, from of the light beams F0, a portion that passes through the opening in the aperture member as the light beams FS, and a portion that surrounds the light beams FS as the light beams FM.

This configuration allows a greater number of light beams to be guided, among light beams that are intercepted by the aperture member and cannot be utilized in optical scanning, to the detector. Hence, the efficiency for light utilization is increased and thereby an S/N ratio at detection is increased. Accordingly, the light amount can be controlled at high accuracy, which enables excellent optical scanning.

Thus, the optical scanner capable of detecting the light amount at a high efficiency for light utilization, increasing the S/N ratio in detection, and excellently controlling the light amount is provided.

The optical scanner can include the splitter that is adjacent to the opening in the aperture member at only one side perpendicular to the sub-scanning direction.

According to this configuration, providing the splitter is on only one side of the opening is sufficient. Therefore, the splitter can have an easily-manufacturable shape. Alternatively, the number of the splitters can be reduced, which allows cost reduction.

As a result, the structure of the splitter is simplified, and manufacturing of the splitter is facilitated.

The optical scanner can include a VCSEL as the light source.

According to this configuration, when the VCSEL is used, in contrast to an LD array that uses a plurality of edge-emitting semiconductor laser diodes, as the number of light beams to be emitted increases, the cost is reduced by a greater amount. Meanwhile, the VCSEL has a considerably short cavity length and therefore has a smaller mode hopping than that of the LD array. This reduces degradation in optical scanning quality due to variations in wavelength.

Hence, cost reduction of the light source system, and miniaturization of the apparatus by integrating the light emitting elements at high density are attained.

The optical scanner can include the beam shaper that has an optical element with a focal length reaching a point between the light source and the splitter. The splitter can be positioned near a rear focal point of the optical element in an optical axis direction of the optical element.

According to this configuration, when a plurality of light beams are used, cross sections of out-of-optical-axis light beams that do not intersect an optical axis of an optical system such as a lens and therefore are at different distances from the optical axis generally do not spatially coincide with one another. When a portion of the light beams is clipped through a single opening, portions corresponding to different areas in light intensity distribution are subjected to detection/light-amount control/scanning. Consequently, the light beams differ from one another in light amount. However, on a focal point of a lens, even chief rays of light beams out of the optical axis intersect with the optical axis, which allows intensity centers of the light beams to align. When the light beams are split through a single splitter at this point, a ratio of a split light amount to a total light amount for each light beam becomes uniform through the light beams. Hence, a light amount control can be performed uniformly on the plurality of light beams. Thus, the light amount on the scanning surface can be corrected to coincide with one another highly accurately. This allows excellent optical scanning with less-uneven exposure.

Therefore, when a plurality of light beams is used, the light beams are substantially identical in ratio, which is a ratio of a portion of light that reaches the detector to the light. Hence, each light beam is allowed to have a highly-accurately uniform amount of light on the scanning surface.

An image forming apparatus according to an embodiment of the present invention includes the optical scanner as described above.

According to this configuration, the light source system that is increased in the utilization efficiency of light emitted from a light source, and the optical scanner capable of performing excellent control of the light amount using the system allows to reduce gradation of image quality and perform highly reliable image forming at low cost while saving energy. The optical scanner using the plurality of light beams enables a high-quality image to be formed at high speed.

Thus, the image forming apparatus capable of reducing unevenness of an image in density, cost reduction, and performing highly reliable image-forming at high speed and high density while saving energy is provided.

A light-amount control method according an embodiment of the present invention is a light amount control method that controls a light amount by detecting light intensities of a plurality of light beams F0 emitted from at least one light source with a detector. The method includes steps of: splitting the light beams F0 into at least light beams FM and light beams FS; guiding the light beams FM to the detector; and performing control such that light components near a light-intensity peak point of the light beams F0 on a cross section perpendicular to a propagation direction of the light beams F0 are included only in the light beams FS rather than in the light beams FM.

With this, the light beams have a substantially circular or elliptic cross section with its intensity peak near the center. Light of the peak portion is supplied to the outside, and light of the remaining portion is detected for control of a light amount. This allows control of the light amount and efficient supply of light to the outside. Efficiency for light utilization is thus improved, which leads to energy saving and reduction of environmental load.

Thus, a light amount can be appropriately adjusted to a desired value, and light of a sufficient amount can be supplied to the outside.

An optical scanning method according to an embodiment of the present invention includes shaping a plurality of light beams using the light amount control method; deflecting the shaped light beams for scanning in a main scanning direction; causing the light beams deflected for scanning to form an image on a scanning surface; and shaping the light beams FS originated from the light source.

With this, employment of the light-amount control method allows to adjust the light amount to a desired value while performing optical scanning. The efficiency in light utilization is enhanced, which leads to energy saving and reduction of environmental load.

Thus, the optical scanning method that allows to increase the efficiency for light utilization, reduce light amount requirement, and, even when a low-output light source is used, detect the light amount as well as perform optical scanning with a sufficient light amount is provided.

An image forming method according to an embodiment of the present invention utilizes the optical scanning method described above.

With this, employment of the optical scanning method allows to adjust the light amount to a desired value while performing optical scanning. The efficiency in light utilization is also enhanced, which leads to energy saving and reduction of environmental load.

Thus, the image forming method that allows to increase the efficiency for light utilization, reduce light amount requirement, and, even when a low-output light source is used, detect the light amount as well as perform optical scanning with a sufficient light amount is provided.

The light source system, the optical scanner, and the image forming apparatus described above can be implemented by a computer program that causes a computer to execute processing. Examples of the computer include a micro processor.

Examples of a recording medium include a computer-readable recording medium such as a compact-disc read only memory (CD-ROM), a flexible disk (FD), a CD recordable (CD-R), and a digital versatile disk (DVD), or a semiconductor memory such as a hard disk driver (HDD), a flash memory, a random access memory (RAM), a read only memory (ROM), and a ferroelectric ROM (feROM).

Figure 2:
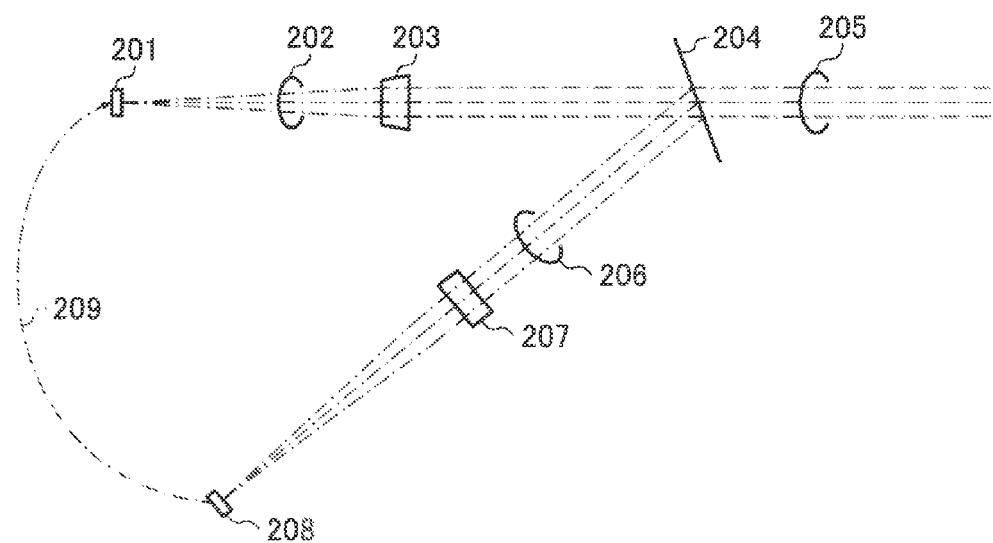
FIG. 2 is a schematic of a light source system according to an embodiment of the present invention.

FIG. 2 is a schematic of a light source system according to an embodiment of the present invention.

The light source system is arranged such that light beams F0 (202) emitted from a light source 201 reach the splitter. The light source 201 is not limited to a particular type so long as being capable of emitting a light beam. For example, a general edge-emitting semiconductor laser diode (LD), a light source formed by combining a plurality of LDs, or an LD array formed by arranging a plurality of LDs into a single device can be employed.

When the light beams F0 (202) are divergent light beams, the divergence can be reduced through a coupling optical element (e.g., a glass lens, a resin lens, or a diffractive optical element) 203 into light beams of smaller divergence or smaller convergence, or collimated light beams. Hence, the efficiency for light utilization is increased.

In this embodiment, the light beams are shaped into substantially-collimated light beams through the coupling optical element 203. The light beams F0 (202) are split through a splitter 204 into light beams FS (205) and light beams FM (206). The light beams FS (205) are emitted to the outside of the light source system to supply light to an optical apparatus (not shown).

Meanwhile, the light beams FM (206) are converged to a detector 208, which is the only detector, through an optical detecting unit 207 and detected. As the detector 208, a general photodiode (PD) can be employed. Adopting the only one detector eliminates the need of having a corresponding number of detectors to the plurality of light beams, which leads to simplification of the optical system and reduction in the number of devices, and hence miniaturization of the system. Examples of the method of detecting a plurality of light beams with the only one detector include a time-division detecting method of sequentially lighting each light emitting device and thereby detecting its light beams, and a method of simultaneously detecting light beams emitted from some of a plurality of light emitting devices while changing the combination of the light emitting devices in two or more patterns, thereby calculating a light amount of each light emitting device.

The splitter 204 perform splitting such that light components near a light-intensity peak point of the light beams F0 (202) on a cross section perpendicular to a propagation direction of the light beams F0 are included only in the light beams 205 rather than in the light beams FM (206). Descriptions are made on this point with reference to FIGS. 3A to 3C and 4.

Figure 3A:
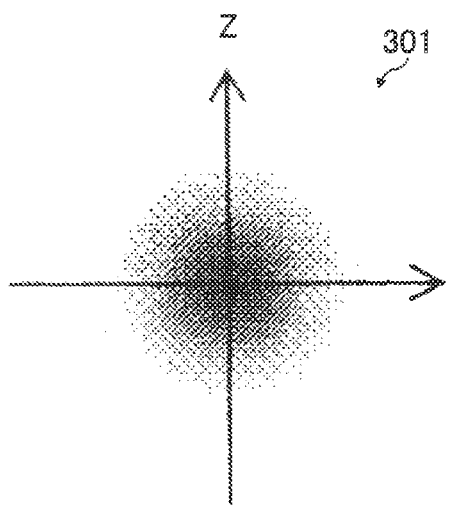
FIG. 3A is a schematic for explaining a spatial distribution of light intensity of light beams F0 on a plane (Y-Z plane) perpendicular to propagation (X-direction) of the light beams.
Figure 3B:
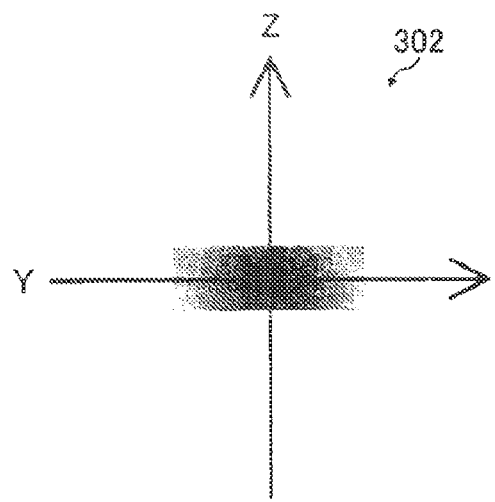
FIG. 3B is a schematic for explaining a spatial distribution of light intensity of light beams FS having been split through a splitter shown in FIG. 2 on the Y-Z plane.
Figure 3C:
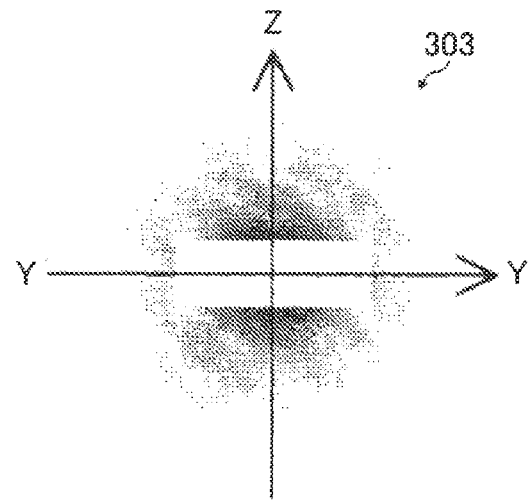
FIG. 3C is a schematic for explaining a spatial distribution of light intensity of light beams FM.

FIGS. 3A to 3C are schematics for explaining light beams and spatial distribution thereof, each schematically depicting a spatial distribution of light intensity of the light beams on a plane (Y-Z plane) perpendicular to propagation (X-direction) of the light beams. The darker, the higher the light intensity. In FIGS. 3A to 3C, reference numeral 301 denotes the light beams F0, reference numeral 302 denotes of the light beams FS having been split through the splitter 204, and reference numeral 303 denotes the light beams FM.

According to the embodiment, when the light beams F0 (301) are assumed to be light beams having a substantially circular cross section, a portion of the light beams near the origin point in the Y-Z plane, at which the intensity peaks, is included only in the light beams FS (302), while the light beams FM (303) includes the remaining portion of the light beams. Hence, the light beams FS are supplied to the outside with a minimum loss.

FIG. 4 is a graph of a relation among the light beams F0 (301), the light beams FS (302), and the light beams FM (303), in which the horizontal axis represents the position coordinate and the vertical axis represents the light intensity.

A portion near the intensity peak, indicated by a solid line, of the light beams F0 is clipped and defined as the light beams FS, and a portion surrounding the light beams FS is defined as the light beams FM. Even when the light beams FS which are high in intensity and small in diameter are required, clipping a portion near the peak in such a manner allows to efficient supply of light to an optical apparatus.

Meanwhile, as shown in FIG. 2, the light beams FM are converged through the optical detecting unit 207 before being guided to the detector 208. Therefore, the light beams FM can be diverged to a certain extent as shown in FIGS. 3A to 3C and 4. As the light beams FM to be guided to the detector 208, a portion on only one of the right and left sides in FIG. 4 can be employed.

In this embodiment, it is assumed that: F0=FS+FM, alternatively, the light beams satisfying F0>FS+FM can be employed. Further alternatively, still light beams can be clipped to be guided to another detection mechanism in the light source system, or to be supplied to an optical apparatus. Thus, highly-efficient utilization of light emitted from the light source is attained.

When an optical apparatus to be supplied with light beams requires shaping or spatially selective utilization of the light beams using an aperture member or the like, a portion of the light beams intercepted by the aperture member becomes a complete loss. This reduces a utilization efficiency of light emitted from the light source in the entire system. The thus-intercepted portion of light is used in light detection for a light amount control to thereby efficiently utilize the intercepted portion in the light source system.

The detector 208 is capable of detecting a light intensity (light amount), and obtains information on an intensity of light beams emitted from the light source. Hence, the detector 208 drives the light source (moves the light source along a dashed line 209) based on the information to attain a desired light intensity.

Figure 5:
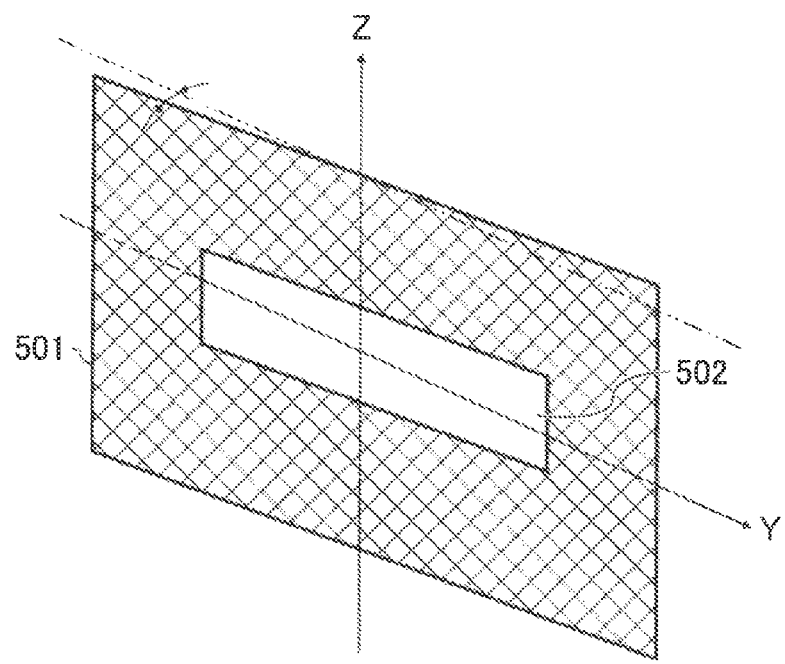
FIG. 5 is an external perspective view of an example of a light reflecting member.

As the splitter 204, for example, a light reflecting member as shown in FIG. 5 can be employed.

Figure 6:
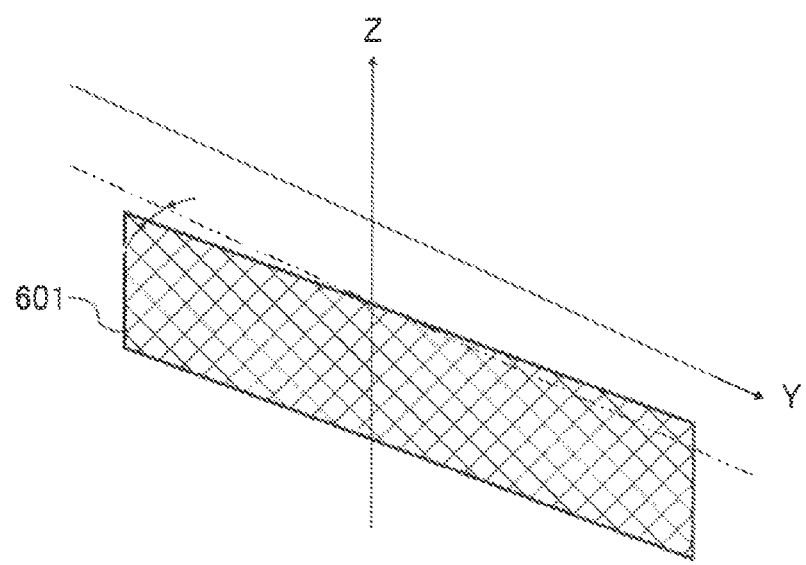
FIG. 6 is an external perspective view of another example of a light reflecting member.

Each of FIGS. 5 and 6 is an external perspective view of an example of a light reflecting member 501.

The light reflecting member 501 clips the light beams FM from the light beams F0, while the light beams FS pass through an opening 502. To perform detection at a high S/N ratio, the light reflecting member 501 is desirably high in reflectivity and made of a highly-processable material. For example, the light reflecting member 501 can be formed by forming an hole in a sheet metal, or applying light-reflecting coating, such as vapor deposition of aluminum, to a molded resin member with an opening therein.

In this embodiment, the opening has a rectangular shape elongated in the Y-direction. However, the opening can have, for example, a square, a rectangular elongated in the Z-direction, a circular, an elliptic, or another polygon shape. Further alternatively, the opening can have any shape according to a demand of the optical apparatus to which the light is to be supplied, and the shape is not limited to the shapes referred to in this description.

A modification of the embodiment is described next.

As the splitter, a light reflecting member 601 as shown in FIG. 6 can be employed. When the light intensity guided to the detector is sufficiently high, the splitter can have such a simple shape as shown in FIG. 6 for simplification of a processing method. Hence, by disposing the light reflecting member 601 so as not to interfere an optical axis, at which the light beams peak, the light source system capable of supplying light without a loss is obtained. The light source can be a single light source that generates a plurality of light beams or a plurality of light sources. Light beams emitted from the plurality of light sources can be combined through a prism or the like.

Figure 7:
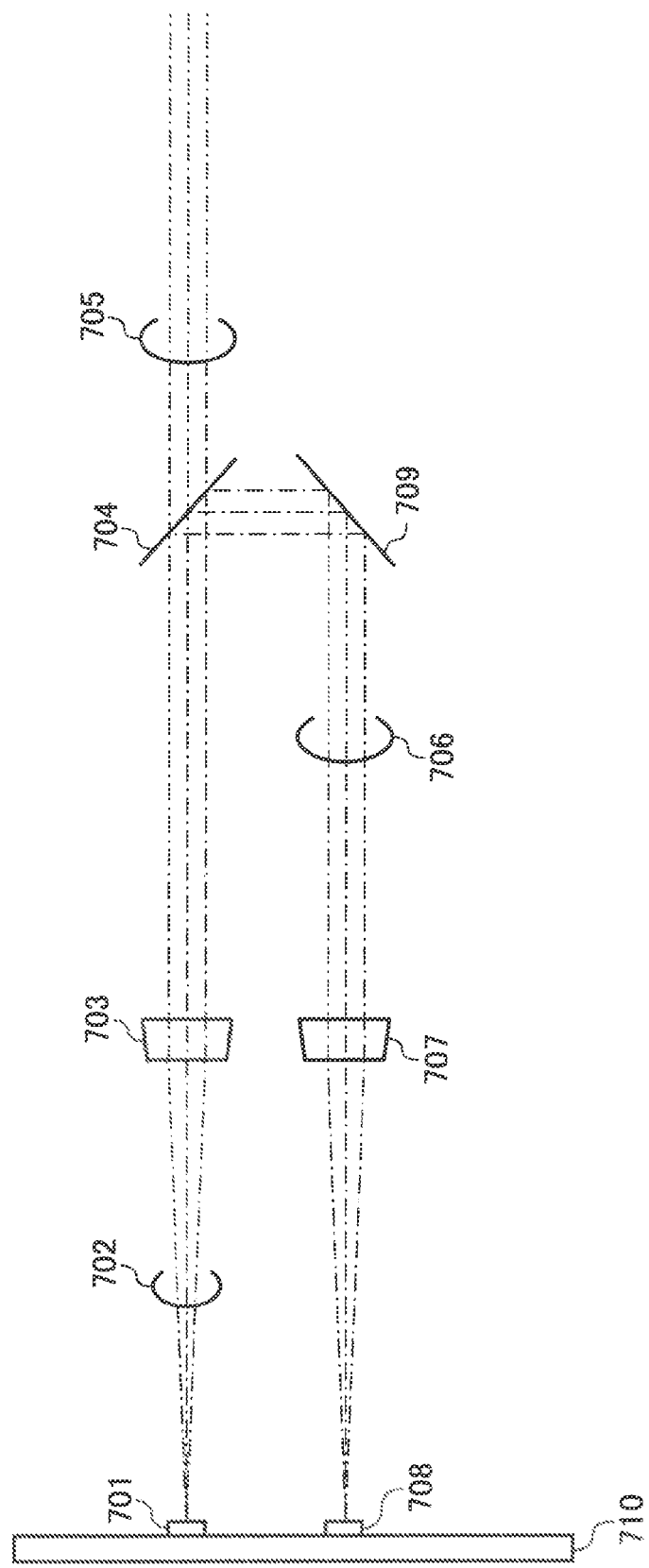
FIG. 7 is a schematic of a light source system according to another embodiment of the present invention.

FIG. 7 is a schematic of a light source system according to another embodiment of the present invention.

The light source, the light beams F0, the light beams FS, the light beams FM, the coupling optical element, the splitter, the optical detecting unit, and the detector are basically the same as those previously described in the above embodiment.

This embodiment differs from the previous embodiment in that a mirror 709, which is a reflecting member, bends the optical path; a detector 708 is disposed near a light source 701; and the detector 708 and a portion of driving circuit 710 that drives the light source 701 are integrally formed.

In this embodiment, a wiring board is used in a shared manner. This configuration facilitates wiring to provide feedback for use in control of the light amount based on information on detection performed by the detector 708 to drive the light source 701. The configuration eliminates the need of having separate boards, which allows miniaturization of the system.

Figure 8:
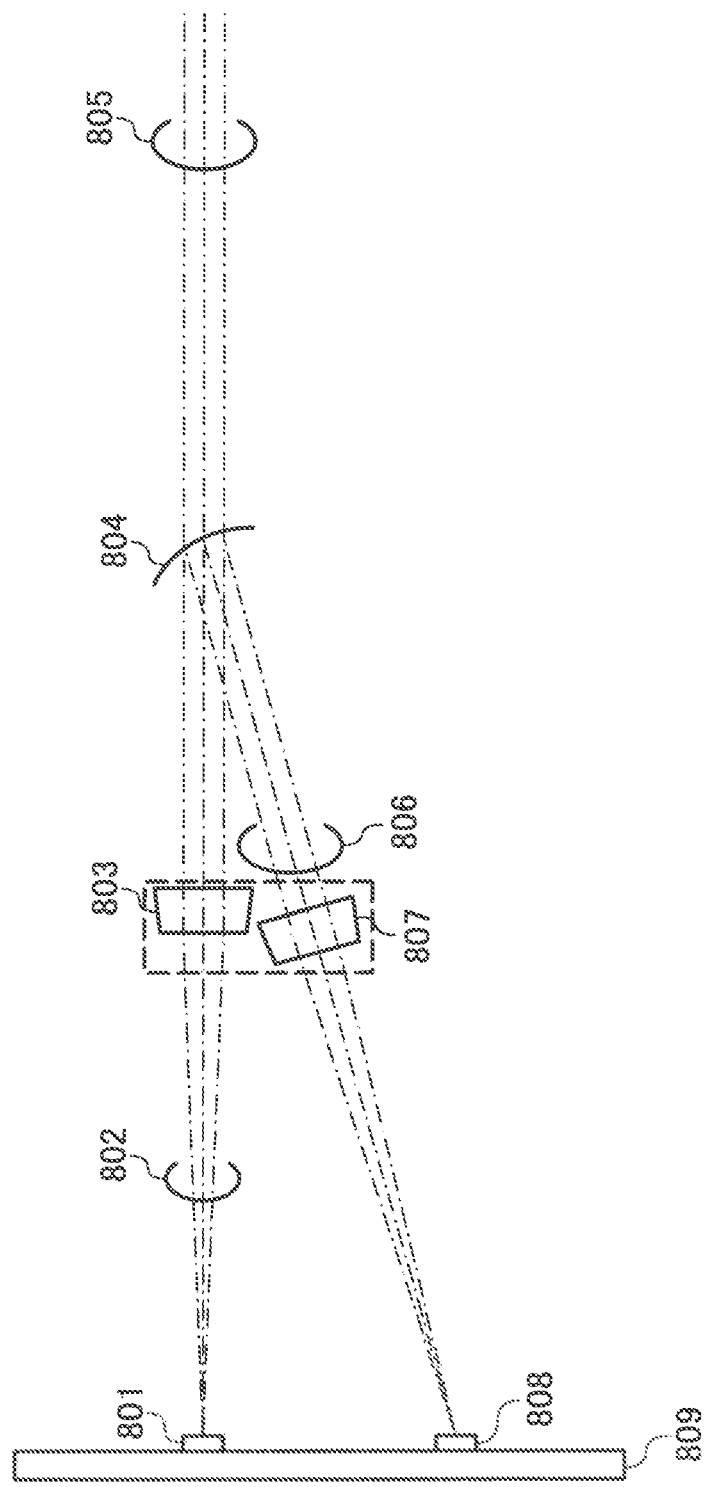
FIG. 8 is a modification of the light source system according to the embodiment.

FIG. 8 is a modification of the light source system.

The mirror 709 included in the system shown in FIG. 7 is omitted from the system shown in FIG. 8. Accordingly, light beams FM (806) is reflected only once. The above configuration reduces a positional error in a light beam spot on a detector 808 due to a manufacturing error of the reflecting member, thereby further reducing the detector 808 in size. Hence, cost reduction and miniaturization of the light source system are attained.

In addition, a coupling optical element 803 and an optical detecting unit (in this modification, a lens) 807 can be positioned close from each other as shown in a frame of a dashed line in FIG. 8, the coupling optical element 803 and the optical detecting unit 807 can be formed into one unit; for example, as a molded resin unit.

Alternatively, the coupling optical element 803 can be arranged to provide two functions by, e.g., forming the coupling optical element 803 as a glass lens and causing light beams F0 (802) to pass through the coupling optical element 803 while causing the light beams FM (806) to pass through a peripheral portion of the lens.

A splitter 804 can be a curved mirror with a positive focal power with respect to the light beams FM (806).

When the curved mirror is employed as the splitter 804, the splitter is provided with a function as the optical detecting unit that converges light beams on the detector. This allows to eliminate the optical detecting unit (in this modification, the lens) 807 and hence reduce the number of components.

FIG. 9 is a schematic of a light source system according to still another embodiment of the present invention.

The light source, the light beams F0, the light beams FS, the light beams FM, the coupling optical element, the optical detecting unit, and the detector are basically the same as those previously described in the above embodiment.

This embodiment differs from the previous embodiment in that a splitter 904 is an optically transparent member.

Examples of the optically transparent member include diffractive optical elements, such as a triangular prism and a wedge-shaped prism, and a device having a structure (sub wavelength structure (SWS)) smaller than a light wavelength. When a reflecting member such as a mirror is employed, the light beams are susceptible a dimensional error related to installation and its surface shape. Hence, a position of the light beam spot is likely to deviate from a designed value.

This deviation of the light beams spot on the detector 908 such as a PD can be reduced by splitting the light beams through the optical element being a transparent member. The splitter can have such a shape and a location relative to the light beams as those of the splitter in FIG. 5 or the splitter in FIG. 6 (the splitter is positioned such that the intersection of the Y-axis and the Z-axis is at a substantial center of the light beams, at which the light intensity peaks).

FIG. 10 is a schematic of an example of an optical scanner using a light source system 1009. In FIG. 10, (a) is a plan view of the optical scanner, (b) is a side view thereof, and (c) is an enlarged view of a portion near a splitter 1004 in the light source system 1009 in a main scanning plane.

FIG. 10 depicts a ray diagram related to the optical scanner that uses the light source system 1009, which is a system as shown in FIG. 2, and shapes light beams F0 (1002) emitted from a light source 1001 through a beam shaper 1012. The beam shaper 1012 is also referred to as the coupling optical unit, and formed with a coupling optical element 1003, an aperture member 1010, and a linear-image forming device 1011. The optical unit is arranged such that the light beams F0 (1002) and light beams FM (1006) are substantially parallel to a main scanning plane.

The main scanning plane is a cross section, as shown in (a) of FIG. 10, parallel to the main scanning direction and the optical axis. A sub-scanning plane is the Z-X plane as shown in (b) of FIG. 10. The light beams F0 (1002) are collimated into substantially collimated light beams through the coupling optical element 1003. Light beams FS (1005) emitted from the light source system 1009 are shaped into light beams having a desired cross section through the aperture member 1010, and forms a linear image elongated in the sub-scanning direction near a polygon mirror 1014 through the linear-image forming device 1011, which is the deflector. The aperture member 1010 is provided upstream from the splitter 1004 as a separate member from the splitter 1004.

The light beams are caused to perform optical scanning in the main scanning direction by the polygon mirror 1014, and form an image, as a beam spot, on a scanning surface through an optical scanning unit including a first scanning lens 1016 and a second scanning lens 1017.

In (c) of FIG. 10, reference letters WO and Ws denote a width of light beams F0 (1020) and a width of light beams FS (1023), respectively. Reference letters Wv denotes a width of light beams FV (1022) that correspond to neither the light beams FS nor the light beams FM and are subjected to vignetting to become stray light. When the thickness of a splitter 1019 is assumed "d", the following equation holds: $Wv=dx_{sin\theta}$.

The splitter 1019 is a plate member with a hole therein, and tilted by θ from a cross section (indicated by a dashed line in (c) of FIG. 10) perpendicular to a traveling direction (the direction indicted by arrow 1024) of the light beams F0 in the main scanning plane.

The width Ws is 5.2 millimeters because the hole is 5.2 millimeters long in the main scanning direction. The hole is 2.1 millimeters long in the sub-scanning direction. Hence, the light beams FV to be subjected to vignetting has a cross-sectional area of 2.1×Wv.

When the splitter 1019 is assumed to tilt by θ in the sub-scanning plane, the light beams to be subjected to vignetting are similarly calculated to have a cross-sectional area of 5.2× Wv. Thus, the loss in light amount is increased. The splitter 1019 has a hole of the same size as that of the aperture member 1010 which determines the beam spot diameter on the image surface. Therefore, when θ varies due to positional errors, variations in the width Ws, taken along a longer width, of the light beams FS (1023) advantageously suppress the influence on the beam spot diameter small. The same holds for a configuration in which the aperture member 1010 and the splitter 1004 are integrally formed. Accordingly, such an arrangement as shown in (c) of FIG. 10 that causes the light beams FS (1005) and the light beams FM (1006) split in the main scanning plane is desirable.

The configurations of the components of the optical scanner is described below.

The light source 1001 is a VCSEL that has a center wavelength at 780 nanometers and generates a plurality of light beams. An oxide-confined structure corresponding to a light-emitting section on the VCSEL is formed with approximate squares 4 micrometers on a side, of which divergence angle at a full width at half maximum is 9 degrees, and optical output power is 2.5 milliwatts. Forty light-emitting devices are arranged in a two-dimensional array that forms a parallelogram array area elongated in the main scanning direction.

The coupling optical element 1003 is a rotational-symmetry optical element made of a resin. The coupling optical element 1003 has a diffracting surface on a first surface (optical surface on the side close to the light source). A focal length of the element is 45 millimeter, and an effective area is 7 millimeters in diameter. The coupling optical element 1003 collimates light beams emitted from the light source into substantially collimated light beams.

The splitter 1004 is made of a resin, on which reflecting coating with aluminum is applied. The splitter 1004 has an opening therein, the opening assuming a rectangular shape 5.2 millimeters long in the main scanning direction and 2.1 millimeters long in the sub-scanning direction. The surface of which the coating is applied has a flat plate shape. The light beams F0 (1002) and the light beams FM (1006) are arranged to form 40 degrees while being parallel to the main scanning plane.

The optical detecting unit 1007 is an aspherical resin lens with a focal distance of 45 millimeters. The optical detecting unit 1007 is disposed on a detector 1008 to form a beam spot with a diameter of approximately 100 micrometers.

The detector 1008 is a photodiode (PD) which is 0.8 millimeter in diameter.

The aperture member 1010 is made of a resin. The aperture member 1010 has an opening therein, the opening assuming a rectangular shape 5.2 millimeters in the main scanning direction and 2.1 millimeters in the sub-scanning direction.

The linear-image forming device 1011 is a resin optical element having the diffracting surface on its second face (optical surface on the side facing the scanning surface). The linear-image forming device 1011 does not have a focal power in the main scanning direction but has a positive focal power in the sub-scanning direction. The focal length of the linear-image forming device 1011 is 125 millimeters.

An incident mirror 1013 is an aluminum mirror.

The polygon mirror 1014 is the first scanning lens 1016 assuming a quadrangular shape of which inscribed circle is 7 millimeters in radius.

The second scanning lens 1017 is a scanning lens having an optical surface expressed by equations (1) and (2). X represents a coordinate in the direction of the optical axis (coordinate in the horizontal direction in (a) of FIG. 10), and Y represents a coordinate in the main scanning direction (coordinate in the vertical direction in (b) of FIG. 10).

$$X(Y)=C_{m0} \cdot Y^2/[1+v\{1-(1+a_{00}) \cdot C_{m0}^2 \cdot Y^2\}]+a_{01} \cdot Y + a_{02} \cdot Y^2 + a_{03} \cdot Y^3 + a_{04} \cdot Y^4 + \ldots \quad (1)$$

$$C_S(Y)=1/R_{S0}+b_{01} \cdot Y+b_{02} \cdot Y^2+b_{03} \cdot Y^3+\ldots \quad (2)$$

$C_{m0}$, being the reciprocal of a curvature radius Rm, is a curvature at center (Y=0) in the main scanning direction, and "$a_{00}$", "$a_{01}$", "$a_{02}$", . . . are coefficients related to aspherical shapes in the main direction. $C_S(Y)$ is a curvature radius related to Y in the sub-scanning direction. $R_{S0}$ is a sub-scanning curvature on the optical axis, and "$b_{00}$", "$b_{01}$", "$b_{02}$", . . . are coefficients related to the aspherical shape in the sub-scanning direction. Table 1 shows coefficients that represent the surface shapes.

In the Table 1, the coefficients are expressed in exponent notation. For example, −1.10143E+02 represents $-1.10143 \times 10^{02}$.

TABLE 1

|     | L1R1 | L1R2 | L2R1 | L2R2 |
|-----|------|------|------|------|
| Rm  | −1.10143E+02 | −5.79388E+01 | −5.00000E+03 | 7.24165E+02 |
| Rs0 | −4.72788E+02 | −5.00000E+02 | 9.37997E+01 | −6.07124E+01 |
| a00 | 0.00000E+00 | 0.00000E+00 | 0.00000E+00 | 0.00000E+00 |
| a01 | 0.00000E+00 | 0.00000E+00 | 0.00000E+00 | 0.00000E+00 |
| a02 | 0.00000E+00 | 0.00000E+00 | 0.00000E+00 | 0.00000E+00 |
| a03 | 0.00000E+00 | 0.00000E+00 | 0.00000E+00 | 0.00000E+00 |
| a04 | −3.87482E−07 | 1.46716E−07 | 9.47700E−08 | −5.56255E−08 |
| a05 | 0.00000E+00 | 0.00000E+00 | 0.00000E+00 | 0.00000E+00 |
| a06 | 6.88714E−10 | 2.24364E−10 | −7.06271E−12 | 5.42541E−12 |
| a07 | 0.00000E+00 | 0.00000E+00 | 0.00000E+00 | 0.00000E+00 |
| a08 | −3.02912E−13 | −1.24578E−14 | 1.70056E−16 | −6.15064E−16 |
| a09 | 0.00000E+00 | 0.00000E+00 | 0.00000E+00 | 0.00000E+00 |
| a10 | −1.38196E−16 | 5.54989E−18 | −6.11408E−20 | −2.44542E−20 |
| a11 | 0.00000E+00 | 0.00000E+00 | 0.00000E+00 | 0.00000E+00 |
| a12 | 4.97316E−20 | −8.15818E−20 | 3.00776E−24 | 1.76451E−24 |
| a13 | 0.00000E+00 | 0.00000E+00 | 0.00000E+00 | 0.00000E+00 |
| a14 | 0.00000E+00 | 0.00000E+00 | 0.00000E+00 | 0.00000E+00 |
| b01 | 0.00000E+00 | 6.44465E−06 | 4.98759E−07 | 0.00000E+00 |
| b02 | 0.00000E+00 | −2.76702E−06 | −9.40784E−07 | 2.09875E−07 |

TABLE 1-continued

|  | L1R1 | L1R2 | L2R1 | L2R2 |
|---|---|---|---|---|
| b03 | 0.00000E+00 | −1.17939E−08 | 5.11005E−11 | 0.00000E+00 |
| b04 | 0.00000E+00 | −7.27004E−09 | 7.50683E−11 | 0.00000E+00 |
| b05 | 0.00000E+00 | 3.89316E−11 | −5.15221E−15 | 0.00000E+00 |
| b06 | 0.00000E+00 | −5.12654E−12 | −4.81012E−15 | 0.00000E+00 |
| b07 | 0.00000E+00 | −3.86625E−14 | −1.46189E−19 | 0.00000E+00 |
| b08 | 0.00000E+00 | 1.12285E−14 | 7.21434E−19 | 0.00000E+00 |
| b09 | 0.00000E+00 | 0.00000E+00 | 2.22208E−23 | 0.00000E+00 |
| b10 | 0.00000E+00 | 0.00000E+00 | −2.53749E−23 | 0.00000E+00 |

L1R1, L1R2, L2R1, and L2R2 respectively correspond to the first surface and the second surface of the first scanning lens and the first surface and the second surface of the second scanning lens. Thickness at its center of the first scanning lens 1016 is 8 millimeters, and that of the second scanning lens 1017 is 3 millimeters. The distance from the rotation center of the polygon mirror 1014 to the first surface of the first scanning lens 1016 is 43.2 millimeters; that to the first surface of the second scanning lens 1017 is 101.3 millimeters; and that to the image surface is 294.2 millimeters. The half angle of view for an image height of ±150 millimeters is ±34.80, and that for an image height of ±162 millimeters is ±37.40. An angle formed by light beams that impinge on the polygon mirror and the optical axis (X-axis) is 59 degrees. A lateral magnification of the image surface to the light source is 4.9 times in the main scanning direction and 2.3 times in the sub-scanning direction.

Table 2 is a list of light amounts detected on a detector (PD) in the optical scanner using the light source system.

TABLE 2

|  | Efficiency |
|---|---|
| Light beam | 0.398 |
| COL | 0.975 |
| Splitter | 0.850 |
| Optical detecting unit | 0.975 |
| Total | 0.322 |
| Output power at light source (mW) | 2.5 |
| Light power on PD (mW) | 0.80 |

In the Table 2, the value of the "light beam" represents a ratio of an amount of light that reaches a reflecting member of the splitter to the total amount of light emitted from the light source. The value is determined based on an effective diameter of the coupling optical element 1003, a relation between a mirror section and an opening section of the splitter 1004, and light amount distribution (assumed to follow the Gaussian distribution) of the light beams. The "COL" is an abbreviation of "coupling optical element", and the value thereof represents a transmittance. The value of the "splitter" represents a reflectivity.

The value of the "optical detecting unit" represents a transmittance because only one lens is employed. A product of these values is shown as the "total". A product of the total value and the light source output power 2.5 milliwatts is the light amount of the PD. Hence, 0.80 milliwatt is obtained.

Table 3 shows values obtained by performing a similar calculation of values obtained through a conventional light-amount detection using a reflecting portion of a half mirror.

TABLE 3

|  | Efficiency |
|---|---|
| Light beam | 0.565 |
| COL | 0.975 |
| Half mirror | 0.100 |
| Optical detecting unit | 0.975 |
| Total | 0.054 |
| Output power at light source (mW) | 2.5 |
| Light power on PD (mW) | 0.13 |

The calculation is performed assuming 0.1 as the reflectivity of the half mirror. As shown in the Table 3, the light amount on the PD is approximately 0.13 milliwatt at the greatest. Therefore, it is difficult to perform effective detection with small noise. Furthermore, in the conventional technology using a half mirror, light beams passing through the opening section are reduced to 90% of the total light beams, which makes it difficult to be employed in a high-speed image-forming apparatus.

FIGS. 11A, 11B, 12A, 12B, and 13 each depict optical characteristics of the optical scanner.

Figure 11A:
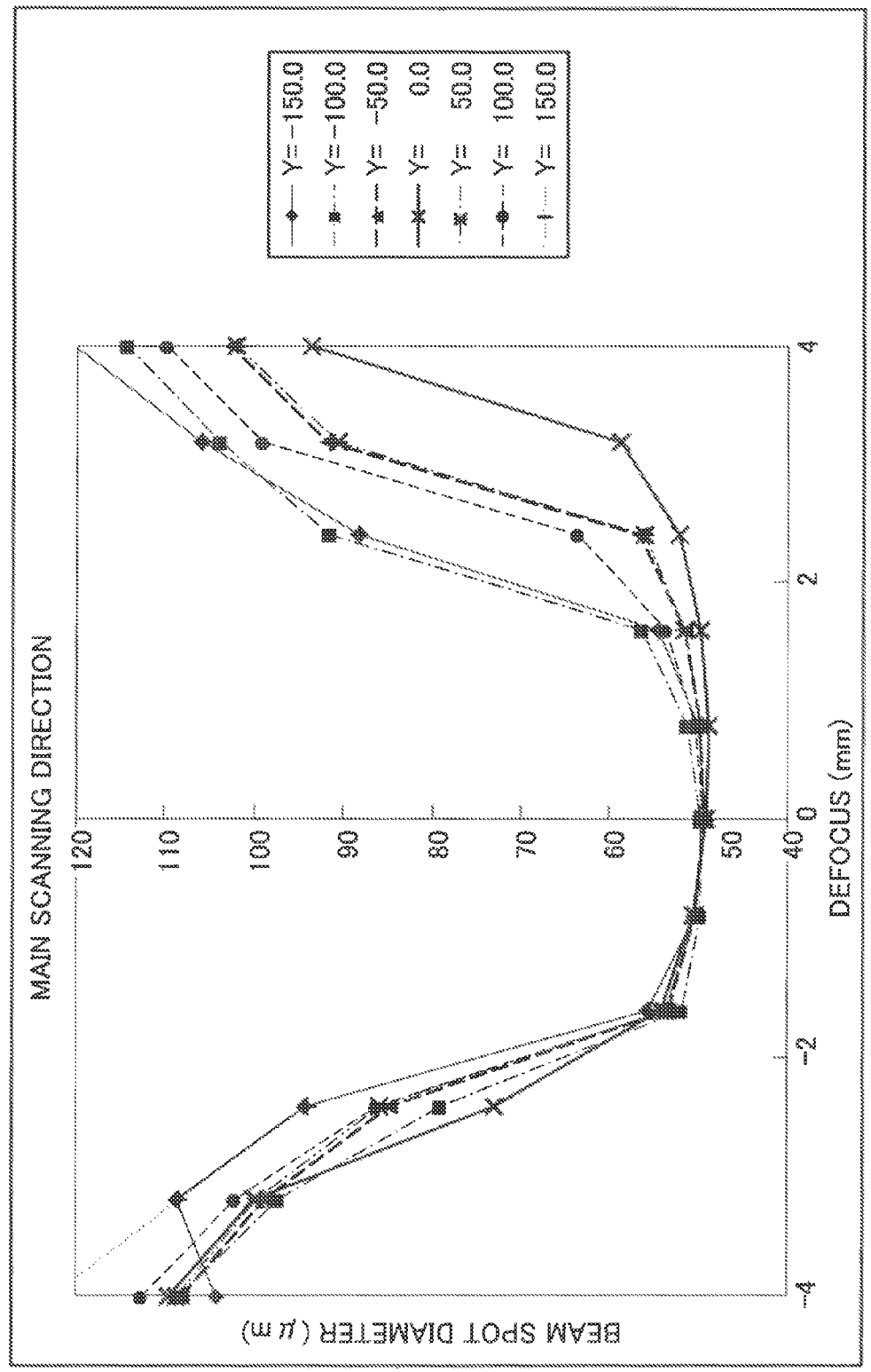
FIG. 11A is a graph of optical characteristic curves for an image height Y ranging from +150 to −150 corresponding to a main scanning direction with a focal depth of 3.2 millimeters, in which the horizontal axis represents a defocus (optical axis direction) and the vertical axis represents a beam diameter.

Each of FIGS. 11A and 11B depicts an optical characteristic curve for the image height Y ranging from +150 to −150. The horizontal axis represents a defocus (in the optical axis direction) and the vertical axis represents a beam diameter. FIG. 11A depicts plots taken in the main scanning direction with a focal depth of 3.2 millimeters. FIG. 11B depicts plots taken in the sub-scanning direction with a focal depth of 5.2 millimeters.

Figure 12A:
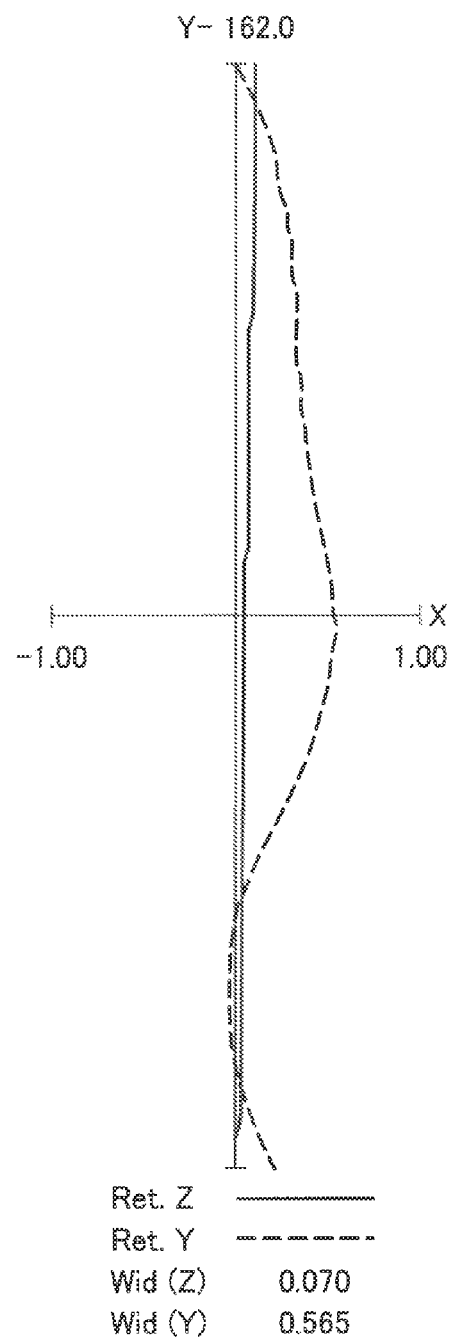
FIG. 12A is a graph of field curvatures with the vertical axis representing the image height and the horizontal axis representing the optical axis direction, in which a dashed line corresponds to the main scanning direction and a solid line corresponds to the sub-scanning direction.
Figure 12B:
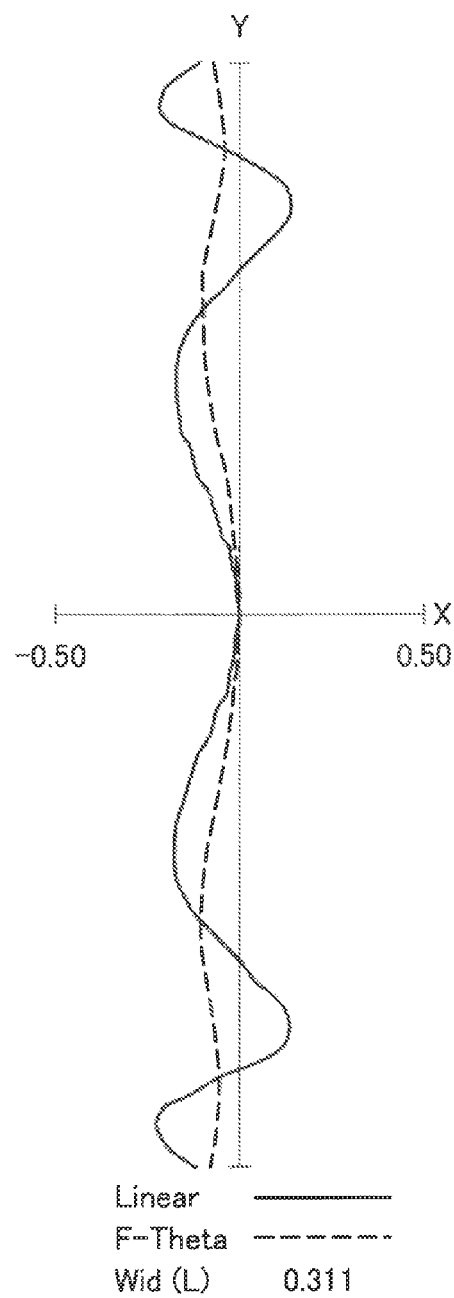
FIG. 12B is a graph with the vertical axis representing the image height and the horizontal axis representing the optical axis direction, in which a solid line indicates a constant-velocity characteristic (linearity) and a dashed line indicates an Fθ characteristic.

In each of FIGS. 12A and 12B, the horizontal axis represents a defocus (in the optical axis direction) and the vertical axis represents an image height. FIG. 12A depicts field curvatures, with a dashed line corresponding to the main scanning direction and a solid line corresponding to the sub-scanning direction. In FIG. 12B, a solid line indicates a constant-velocity characteristic (linearity), and a dashed line indicates an F0 characteristic. The linearity is approximately 0.3%.

Figure 13:
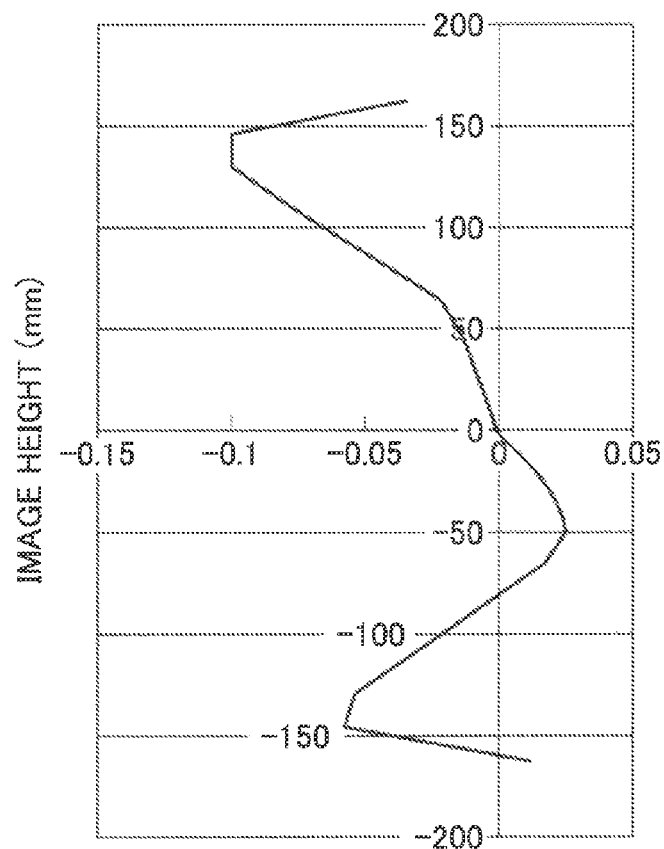
FIG. 13 is a graph of deviations in a lateral magnification in the sub-scanning direction according to the image height.

FIG. 13 a graph of deviations in lateral magnification in the sub-scanning direction with respect to the image height. The vertical axis represents the image height, and the horizontal axis represents a magnification deviation (%) with reference to a magnification at the image height of 0 millimeter. The deviation is reduced to equal to or lower than 0.2%.

Figure 14:
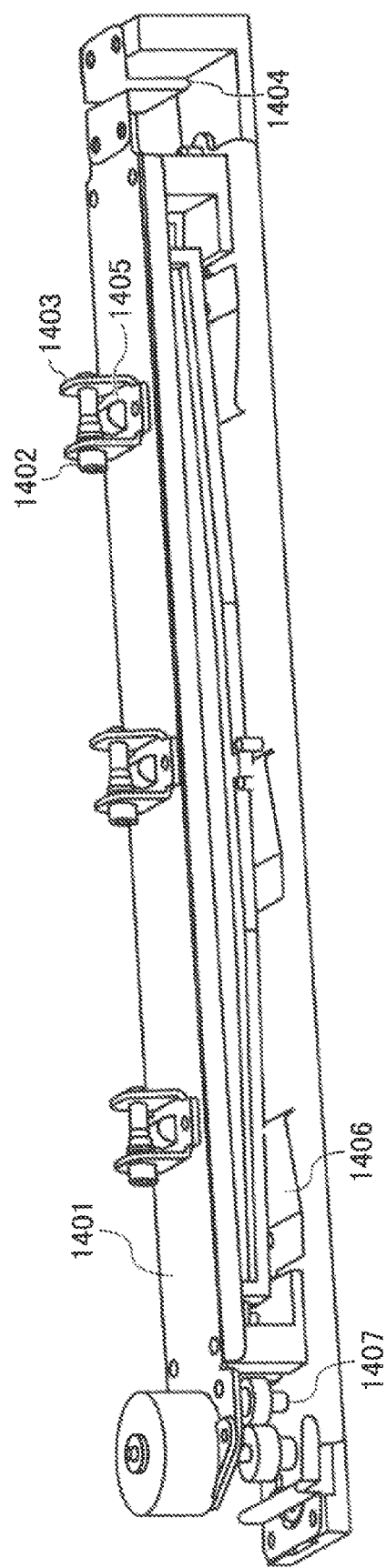
FIG. 14 is an external perspective view of an example of a scanning-lens deforming unit.

FIG. 14 is an external perspective view of an example of a scanning-lens deforming unit.

The scanning-lens deforming unit has a synchronization detecting function of detecting scanning beams at a start point and at an end point of a scanned region, except for a scanning surface 1018 (see (a) and (b) of FIG. 10), to determine a timing at which scanning is to be performed. The scanning-lens deforming unit formed integrally with a holder is provided on the second scanning lens 1017 (see (a) and (b) of FIG. 10). An upper plate metal 1401 and a lower plate metal 1406 support the scanning lens. A taper pin 1402 is moved relative to a bracket 1403, hence a roller 1405 exerts a pressure on the scanning lens parallel to the sub-scanning direction, which deforms the second scanning lens 1017 elongated in the main scanning direction (see (a) and (b) of FIG. 10).

As is obvious from the curvature radiuses shown in the Table 1, the second scanning lens 1017 (see (a) and (b) of FIG. 10) has a large influence on curvature of a scanning line in the sub-scanning direction because the second scanning lens 1017 has a relatively high focal power in the sub-scanning direction. By deforming the second scanning lens 1017 (see (a) and (b) of FIG. 10) as described above, the curvature of the scanning line can be corrected.

The scanning-lens deforming unit shown in FIG. 14 also has a function of tilting the second scanning lens 1017 (see (a) and (b) of FIG. 10) with a leaf spring 1404 and a differential screw mechanism 1407 to correct a tilt of the scanning line, which allows optical scanning with higher quality.

As the light source, an LD, an LD array, or a VCSEL having a center wavelength near 655 nanometers or 405 nanometers can be employed. As a method of using the plurality of light sources, the optical paths of a plurality of LDs can be combined using a waveguide such as a prism, a mirror, and an optical fiber.

As the coupling optical element, a glass aspherical surface, a glass spherical surface, a hybrid lens, a liquid-crystal diffracting element, or a hologram lens can be employed.

The hole (opening) of the splitter can have a circular, an elliptic, or another shape. The size of the hole is desirably larger than that of the opening in the aperture member 1010 to reduce an influence on optical scanning exerted on by a manufacturing error.

The optical detecting unit can be a glass lens, a mirror having a curvature, or a unit formed with two or more of the lens or the mirror.

As the linear-image forming unit, a glass lens having a cylindrical surface, a hybrid lens, a liquid-crystal diffracting element, or a hologram lens can be employed.

When the incident mirror is arranged to have an optical path equivalent to that shown in (a) of FIG. 10; that is, allow light to be directly guided from the linear-image forming device 1011 to the polygon mirror without the incident mirror, the mirror is removable. Hence, an influence by a manufacturing error can be reduced.

Conceivable polygon mirrors vary widely in size and the number of surfaces, any one of such polygon mirrors can achieve the effects of the present invention.

While the optical scanner is explained as a so-called underfilled optical system in which a width of incident light beams in the main scanning direction is smaller than a width of a reflecting facet of a polygon mirror, a so-called overfilled optical system can be employed. In the overfilled optical system, a width of incident light beams in the main scanning direction is greater than a width of a reflecting facet of a polygon mirror. In the overfilled optical system, an amount of light reaching a scanning surface is likely to vary according to an image height, and many of light beams are subjected to vignetting by the polygon mirror. Accordingly, employment of the light source system of the present invention is particularly effective for the overfilled optical system.

The number of the scanning lens can be two, one for cost reduction, or three or more for quality enhancement. The surface shape is obtained by continuously changing a radius of a circle parallel to the Z-X plane about points on noncircular curves in the X-Y plane while satisfying a functional relationship with a position in the main scanning direction. Alternatively, for example, the surface can be spherical, cylindrical, or asymmetrical with respect to the main scanning direction. The optical scanning unit can be formed with a curved mirror.

Figure 15:
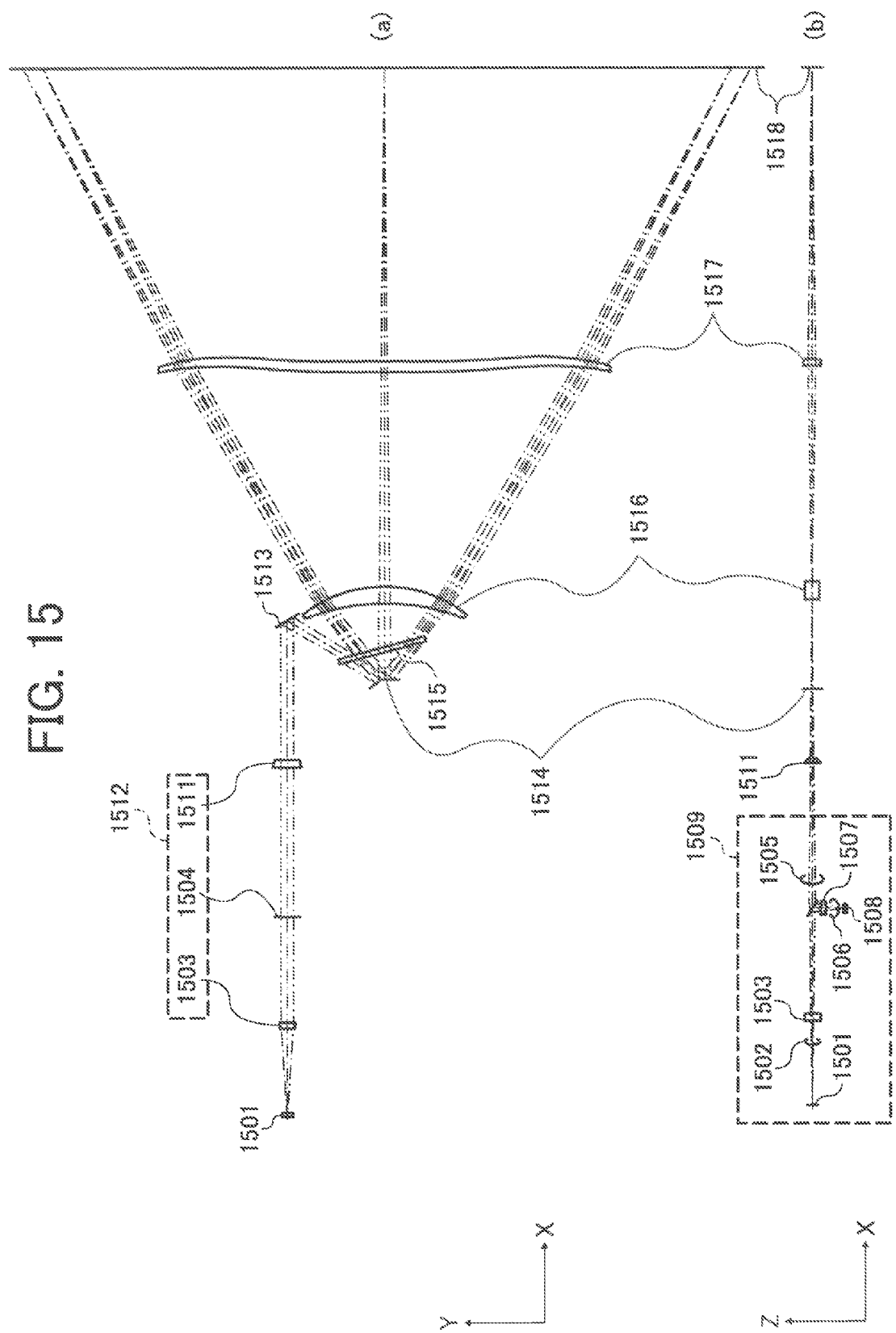
FIG. 15 is a schematic of another example of an optical scanner; (a) is a plan view, and (b) is a side view.

FIG. 15 is a schematic of another example of an optical scanner; (a) is a plan view of the optical scanner, and (b) is a side view thereof.

The optical scanner is basically similar to that of previous example, and devices downstream the incident mirror are identical to those previously described. The optical scanner differs from the previous example in the following points.

Figure 16:
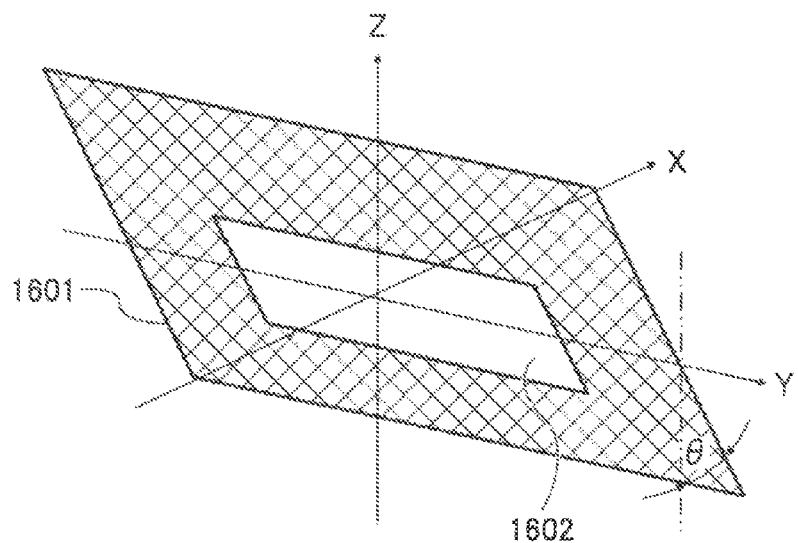
FIG. 16 is an external perspective view of an example of a splitter.

A splitter 1504 is formed integrally with a member corresponding to the aperture member of the optical scanner, which reduces the number of components. The splitter 1504 is rotated by θ=45° about a rotary axis parallel to the Y-axis (FIG. 16). The size of the opening in the splitter 1504 is 5.2 millimeters in the main scanning direction and 2.1 millimeters in the sub-scanning direction, which are identical to that of the previous example. However, this is a projected size of the opening on the Y-Z plane. The lengths of the opening measured along the actual opening are 5.2 millimeters and 2.1/cos θ=3.0 mm.

Using the splitter of a shape as shown in FIG. 16 allows to clip, from light beams F0 (1502), a portion that passes through the opening in the splitter 1504 as light beams FS (1505) and a portion that surrounds the light beams FS (1505) as light beams FM (1506).

Generally, an area of light beams at which the light intensity is $1/e^2$ of the peak intensity is defined as an effective beam spot. To effectively increase the utilization efficiency of light as well as miniaturizing the apparatus, the size of the splitter 1504 in the main scanning and sub-scanning directions is desirably the same as that of the light beam spot. When light beams are limited by an optical element, upstream from the splitter, that has an effective area, the influence thereof is to be considered.

In this example, as described in the previous example, the coupling optical element is a circle of which effective area is 7 millimeters in diameter, and collimates light beams into collimated light beams. Hence, the area of the splitter 1504 on which reflective coating is to be applied is 7.5 mm×7.5 mm with consideration given to a manufacturing error. The thus-split light beams FS (1505) and the light beams FM (1506) form an angle on a plane parallel to the sub-scanning plane.

The angle is 90 degrees in this example. A detector 1508 is disposed on a wall (so-called bottom wall) of an optical housing. When the light beams FM (1506) and the light beams FS (1505) are split in the main scanning direction, the light beams must be guided to one of walls of the optical housing, the wall being vertical to the main scanning plane (X-Y plane). This lengthens the optical path, and makes the system susceptible to a manufacturing error. Even when a stray light is generated in the light source system, deflecting light beams in the Z direction with respect to the scanning lens and polygon mirror that are elongated in the Y direction prevents the stray light from reaching the scanning surface to form an image.

Figure 17:
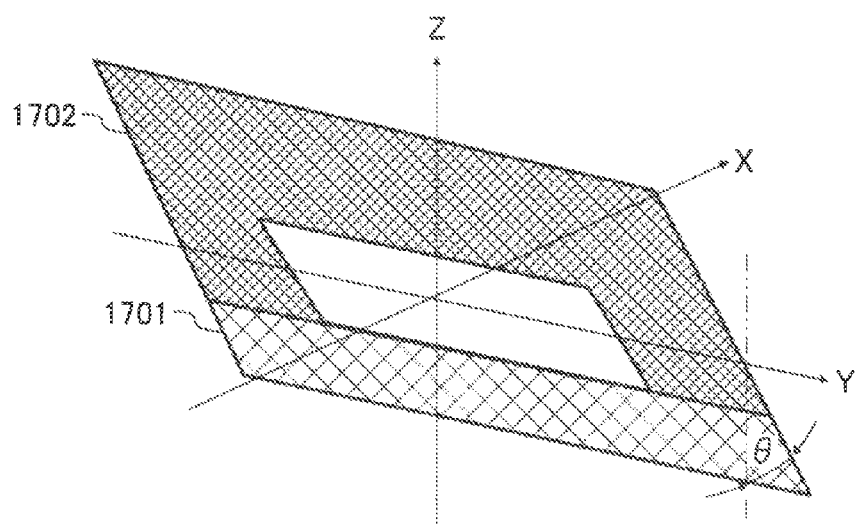
FIG. 17 is an external perspective view of a modification of the splitter.

Examples of a modification of the splitter include the configuration shown in FIG. 17. A reflecting member 1701, shown in gray, functions as the splitter. The reflecting member 1701 is adjacent to the opening only on one side perpendicular to the sub-scanning direction. A light-shielding member 1702 functions as the aperture member.

FIG. 17 is an external perspective view of the modification of the splitter.

When reflective coating is to be applied to the splitter, this configuration reduces an area on which the coating is applied by half, and thereby increase a manufacturing efficiency. The opening of the splitter of this example is elongated in the Y-direction. Therefore, when light beams are incident on the splitter as circular beams, more light beams are intercepted by the splitter on sides of the opening along the sub-scanning direction than the other sides.

The optical path can be deflected with a transparent member, such as a diffracting optical element, in place of the reflecting member 1701 shown in FIG. 17. A beam shaper 1512 has a coupling optical element 1503 between a light source 1501 and the splitter 1504. The splitter 1504 is disposed at a position apart from the coupling optical element 1503 by a substantially rear focal length in the optical axis in the optical axis direction.

Figure 18:
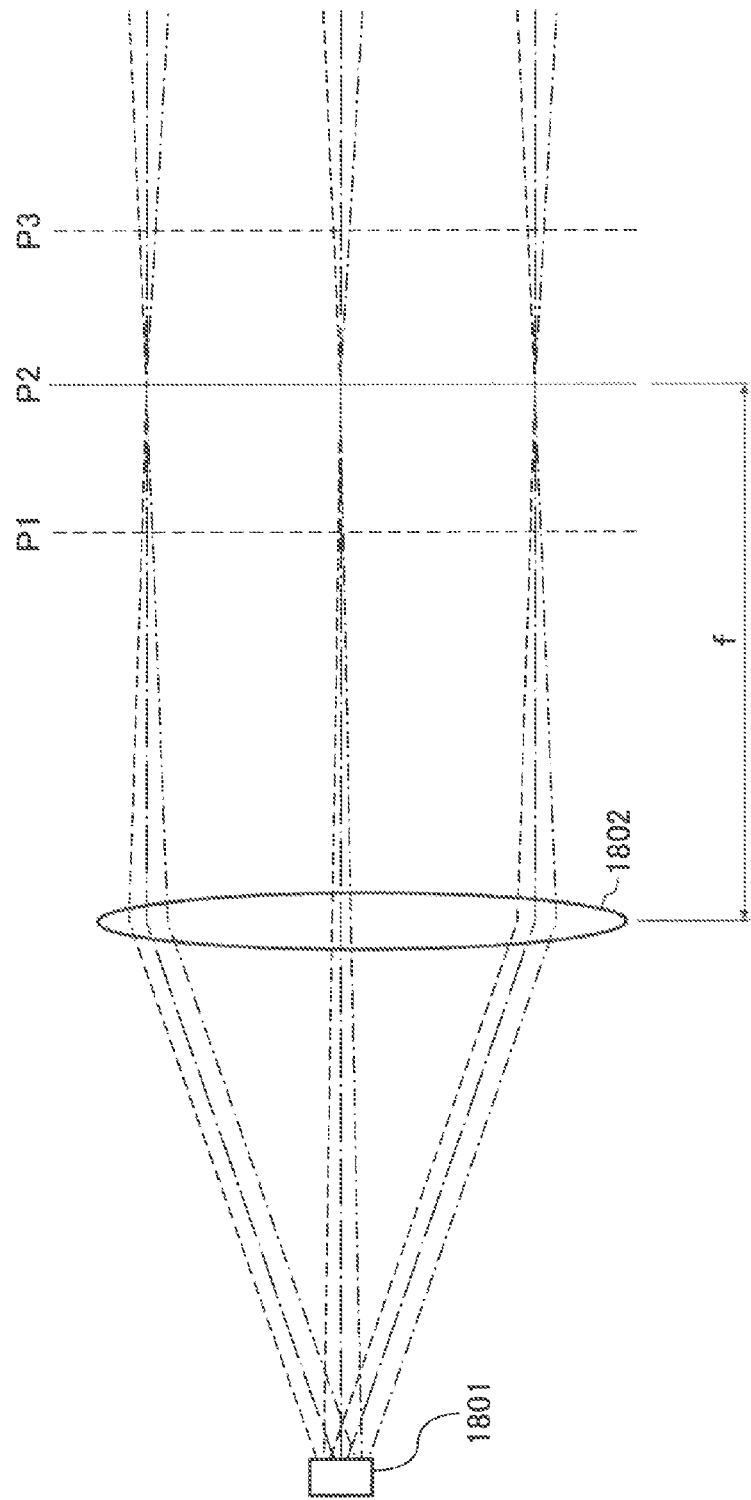
FIG. 18 is a conceptual schematic for explaining effects achieved by using a plurality of light sources.
Figure 19:
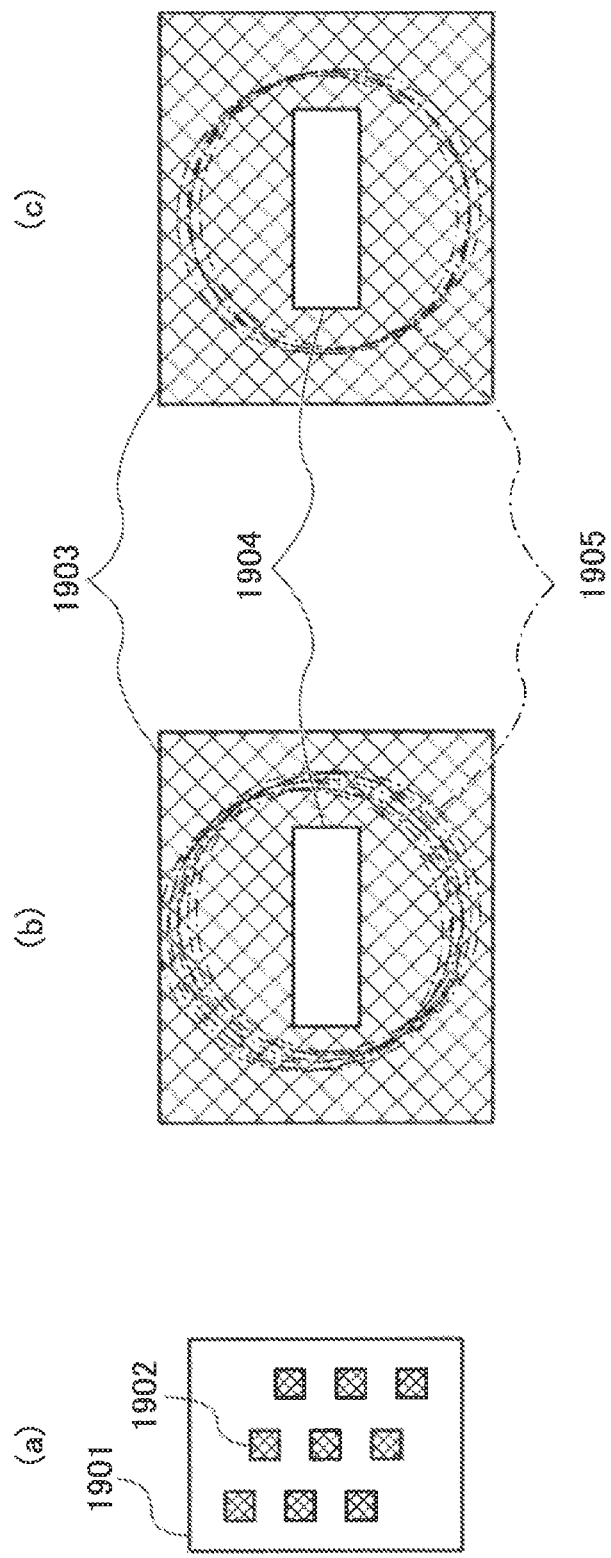
FIG. 19 is another conceptual schematic for explaining effects achieved by using a plurality of light sources.

When the plurality of light sources are used, this arrangement allows to reduce errors in ratios of the light beams FS to the light beams FM among light emitting units due to different positions of the light emitting units. This effect is yielded because a position at which light beams substantially overlap one another in the Y-Z plane and hence have substantially uniform light amount distribution is a focal point. FIGS. 18 and 19 are conceptual schematic for explaining effects achieved by using a plurality of light sources.

When light emitting devices are arranged on a light source 1801 as shown in (a) of FIG. 19, on a plane P1 upstream from a focal length "f" of a lens 1802 shown in FIG. 18, as shown in (b) of FIG. 19, light beams emitted from the light emitting devices are not aligned. This reveals that, when the splitter is disposed on the plane P1, a ratio of a split light in light amount undesirably varies from one light beam to another. The same holds for a configuration in which the splitter is disposed on a plane P3. When the splitter is disposed on a plane P2, which is at a focal length "f", light beams are aligned as shown in (c) of FIG. 19, and variations in light amount of split light among the light beams can be reduced.

Hence, control of light amount of the light beams is also attained uniformly.

When the splitter is tilted with respect to the optical axis, a light amount distribution of light beams on the splitter inevitably deviates. However, employment of the above arrangement minimizes the deviation. This holds not only for the configuration in which light beams are collimated through the lens 1802 but also for a configuration in which light beams are diverged or converged.

Figure 20:
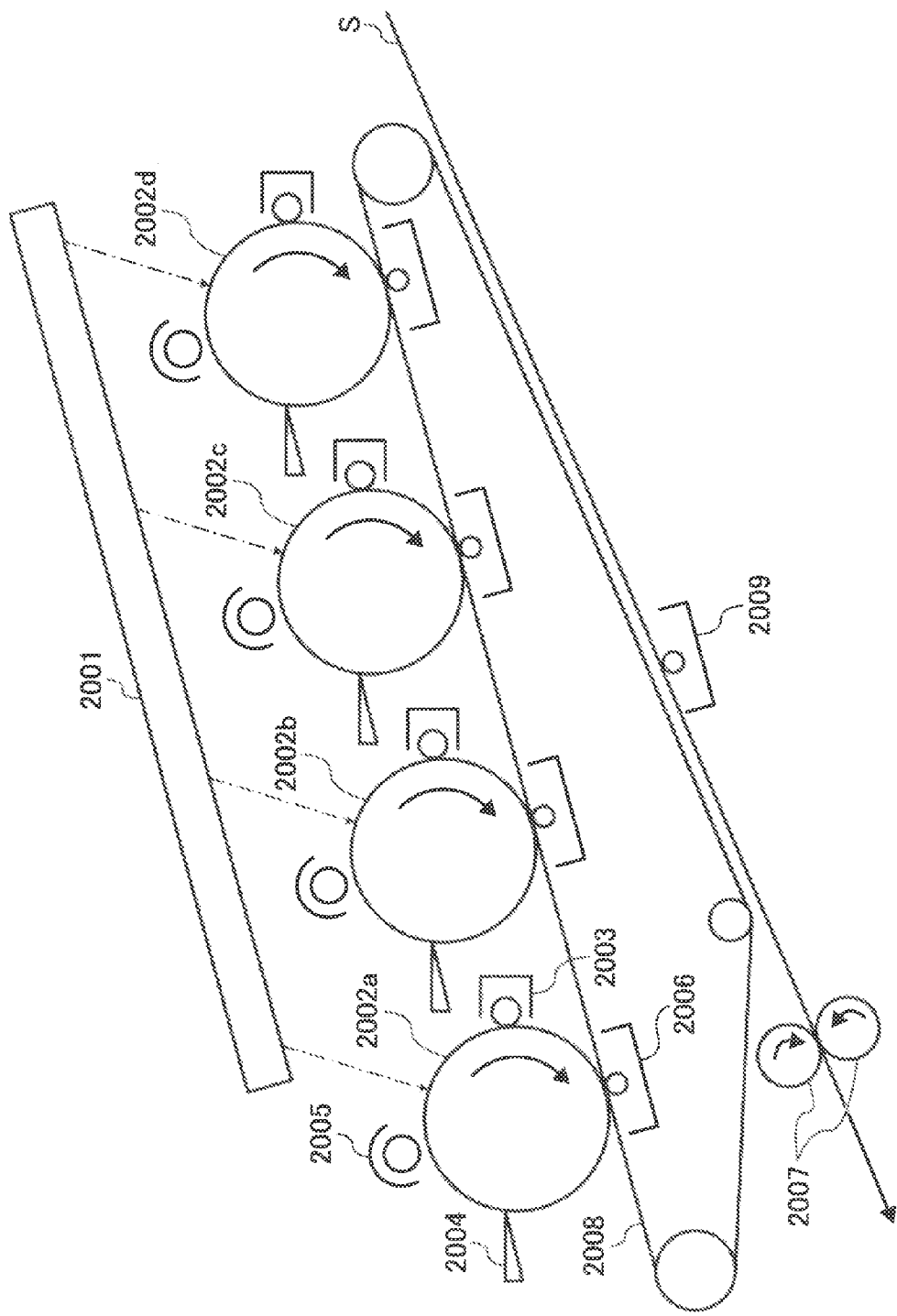
FIG. 20 is an example of an image forming apparatus according to the embodiment.

The optical scanner can be used to form an image forming apparatus. FIG. 20 is an example of an image forming apparatus.

In the multi-color image forming apparatus, a plurality of scanning surfaces are scanned for exposure and form a visible image of each multi color. The images are superimposed one color image on another to thereby form a color image. As shown by arrow in FIG. 20, photosensitive members 2002a to 2002d rotate clockwise at a constant velocity. Surfaces of the photosensitive members 2002a to 2002d are uniformly charged by a charger 2005, and scanned for exposure by an optical scanner 2001 in a similar manner as that in above-described image forming apparatus. Through the exposure, electrostatic latent images are formed on the photosensitive members 2002, and visualized as toner images by a developing unit 2003. The toner images formed on the plurality of photosensitive members 2002a to 2002d by a transfer unit 2006 are sequentially transferred to an intermediate transfer belt 2008 to form a single image, thereby forming a superimposed full-color image.

The full-color image is transferred onto a sheet recording medium S by another transfer unit 2009, and fixed by a fixing unit 2007. Hence, the image forming process is completed, and the medium S is discharged out of the apparatus.

Residual toner and paper lint on the photosensitive members 2002 are removed by a cleaning unit 2004. Thereafter, the photosensitive members 2002 are charged by the charger 2005 again.

Cyan C, magenta M, yellow Y, and black Bk can be used as colors for the photosensitive members 2002. Correspondence of the colors with the photosensitive members 2002a to 200d can be arbitrarily determined and optimized. Examples of the correspondence include abcd=CMYBk and abcd=YMBkC. For the optical scanner performs scanning of a position at which enhancing the scanning quality is difficult or includes a photosensitive member from which the need of adjustment or the other process is desirably eliminated, the colors are desirably determined in accordance with a brightness and saturation. For example, for a photosensitive member having the least favorable optical characteristic (e.g., large image surface curvature and large curvature of scanning line), Y which is low in saturation or high in brightness is desirably used. In the image forming apparatus, the photosensitive members have the same size. However, by setting one or more of the photosensitive members to have a higher durability by, e.g., making the photosensitive member corresponding to Bk larger, stability of the entire apparatus can be increased.

The light beams have a substantially circular or elliptic cross section with its intensity peak near the center. Light of the peak portion is supplied to the outside, and light of the remaining portion is detected for control of a light amount. This allows control of the light amount and efficient supply of light to the outside. Efficiency for light utilization is thus improved, which leads to energy saving and reduction of environmental load.

The light receiving element or the like, which functions as the detector, and the light source are supported on a single substrate or a single base member. Therefore, a necessary footprint can be reduced as compared with a configuration in which the detector and the light source are independently formed, and hence miniaturization of the system and an apparatus using the system are attained. In addition, a wiring board, a support member, and the like can be used partially in a shared manner. This reduces the number of components and thereby reduces cost and environmental load.

Using a light reflecting member such as a mirror as the splitter allows light to be supplied to the detector and/or to the outside highly efficiently with low loss. In addition, the system can be miniaturized because the optical path can be bent using a mirror.

A configuration in which the splitter converges light on the detector to thereby function also as the optical detecting unit can be taken. In this configuration, the need of forming the optical detecting unit with another component is eliminated, and the number of components is reduced. The reduction in the number of components also reduces the footprint for devices, and hence miniaturizes the apparatus.

When a lens or a prism, being a transparent optical element, or a diffracting optical element is employed, a positional deviation of a beam spot can be reduced because light beams are insusceptible to a surface shape of the element in contrast to a surface shape of a reflecting optical element such as a mirror. Hence, miniaturization of the light receiving element is attained. In addition, having a sufficient allowance in accuracy of the surface shape improves a yield rate and reduces the cost of the system.

When a plurality of light beams are used, cross sections of out-of-optical-axis light beams that do not intersect an optical axis of an optical system such as a lens and therefore are at different distances from the optical axis generally do not spatially coincide with one another. When a portion of the light beams is clipped through a single opening, portions corresponding to different areas in light intensity distribution are subjected to detection. Consequently, the light beams undesirably differ from one another in light amount. However, on a focal point of a lens, even chief rays of light beams out of the optical axis intersect with the optical axis, which enables intensity centers of the light beams to align. When the light beams are split through a single splitter at this point, a ratio of a split light amount to a total light amount for each light beam becomes uniform through the light beams. Hence, a light amount control can be performed uniformly on the plurality of light beams.

Employment of the light source system enables adjustment of a light amount to a desired value during optical scanning. The efficiency in light utilization is also enhanced, which leads to energy saving and reduction of environmental load.

When the light beams are to be shaped through the opening in the aperture member, vignetting of a miniscule number of light beams undesirably occurs at edges of the opening; that is, at a boundary between a light-beam passing portion and a light-beam intercepting portion, due to a limit in machining accuracy. However, the influence of this vignetting is considerably small because a typical aperture member is arranged perpendicular to a traveling direction of the light beams. On the contrary, when a member, such as the splitter and the aperture member, is arranged obliquely to the traveling direction of the light beams rather than perpendicularly, vignetting of light beams occurs depending on the thickness of the member. As an angle of the light beams increases with respect to a plane perpendicular to the light beam traveling direction, the amount of the light beams subjected to vignetting increases, and the apparatus becomes more susceptible to a dimensional error and a positional error that have occurred during manufacturing. Even when the same amount of light beams are subjected to vignetting, the larger the opening width, the less influence the vignetting exerts in terms of a ratio. Hence, variations of beam spot diameters on an image surface that are dependent on the opening can be reduced. Therefore, at least one of the splitter and the aperture member is desirably arranged to be rotated about its rotary axis perpendicular to a direction along which longer sides of the opening extend.

Even when a surface of the splitter forms an angle with the traveling direction of the light beams F0, to reduce the amount of the light beams subjected to vignetting. Hence, variations of the beam spots in diameter, which is determined by the opening, due to a manufacturing error are reduced. As for the layout, an image-forming optical system that includes the optical scanning unit and the light source system are housed in an optical housing to form the optical scanner. In the layout, generally, a lid of the optical housing is substantially parallel with a main scanning plane. Accordingly, an optical element disposed in the optical housing such that the light beams FS and FM in the light source system are substantially collimated with the main scanning plane is facilitated to receive arrangement and adjustment works in a state with the lid of the optical housing removed. Thus, a reduction in a manufacturing yield rate is prevented, which increases a manufacturing speed. In addition, positional adjustment of components such as the light receiving element and the optical element; e.g., the splitter, is facilitated. Thus, the light beams FM is guided to the light receiving element without fail. In addition, reduction of the thickness of the entire optical housing in the sub-scanning direction is attained, which allows miniaturization of the optical scanner.

When arrangement of each component that forms the light source system in the main scanning plane is considerably restricted (by, e.g., interference between the component and the optical scanning unit or the optical housing), the interference can be avoided by distributing light beams in the sub-scanning direction. Even when a stray light is generated by any one of the optical elements in the light source system, it is possible to cause the stray light to less easily reach the scanning surface. For example, light reflected from a surface of a lens that converges light to the light receiving element has an angle in the sub-scanning direction. Therefore, the reflected light does not reach a light deflector (e.g., polygon mirror). Even when the reflected light in directly incident on a scanning lens, the light is deviated from regular scanning light beams in the sub-scanning direction on the way to the scanning surface, and does not reach the scanning surface. This reduces ghost.

The member functioning as the aperture member is processed to have the function as the splitter, thereby integrating the two functions into the single member to reduce cost. This reduces the footprint and hence miniaturizes the apparatus.

The aperture member and the splitter are configured as separate members, which facilitates manufacturing of them, and hence increases a manufacturing yield rate. In addition, disposing the splitter upstream from the aperture member to be closer to the light source shortens the optical path from the light source to the detector. This leads to miniaturization of the apparatus, and, even when the apparatus has a manufacturing error, deviation of the beam spot on the detector can be reduced.

Since a larger number of light beams, among light beams that are intercepted by the aperture member and cannot be utilized in optical scanning, are guided to the detector, the efficiency for light utilization is increased, which increases an S/N ratio at detection. Accordingly, the light amount can be controlled at high accuracy, which enables excellent optical scanning.

Accordingly, providing the splitter is on only one side of the opening is sufficient. Therefore, the splitter can have an easily-manufacturable shape. Alternatively, the number of the splitters can be reduced, which allows cost reduction.

When the VCSEL is used, in contrast to an LD array that uses a plurality of edge-emitting semiconductor laser diodes, as the number of light beams to be emitted increases, the cost is reduced by a greater amount. Meanwhile, the VCSEL has a considerably short cavity length and therefore has a smaller mode hopping than that of the LD array. This allows reduction of degradation in optical scanning quality due to variations in wavelength.

When a plurality of light beams are used, cross sections of out-of-optical-axis light beams that do not intersect an optical axis of an optical system such as a lens and therefore are at different distances from the optical axis generally do not spatially coincide with one another. When a portion of the light beams is clipped through a single opening, portions corresponding to different areas in light intensity distribution are subjected to detection/light-amount control/scanning. Consequently, the light beams differ from one another in light amount. However, on a focal point of a lens, even chief rays of light beams out of the optical axis intersect with the optical axis, which allows intensity centers of the light beams to align. When the light beams are split through a single splitter at this point, a ratio of a split light amount to a total light amount for each light beam becomes uniform through the light beams. Hence, a light amount control can be performed uniformly on the plurality of light beams. Thus, the light amount on the scanning surface can be corrected to coincide with one another highly accurately. This enables excellent optical scanning to be performed with less-uneven exposure.

The light source system that is increased in utilization efficiency of light emitted from a light source, and the optical scanner capable of performing excellent control of the light amount using the system allow to reduce degradation of image quality and perform highly reliable image forming at low cost while saving energy. The optical scanner using the plurality of light beams enables a high-quality image to be formed at high speed.

According to an embodiment of the present invention, the light beams have a substantially circular or elliptic cross section with its intensity peak near the center. Light of the peak portion is supplied to the outside, and light of the remaining portion is detected for control of a light amount. This enables control of the light amount and efficient supply of light to the outside. The efficiency for light utilization is thus increased, and energy saving and reduction of environmental load are attained.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner, comprising:
   a light source system that includes at least one light source, the light source system comprising:
      a splitter that splits a first light bundle emitted from the at least one light source into at least a second light bundle and a third light bundle such that a light component at a peak of a light intensity in a plane perpendicular to a propagation direction of the first light bundle is included only in the third light bundle;
      a detector that receives the second light bundle; and
      an optical detecting system that guides the second light bundle to the detector;
   a deflector that deflects and scans the third light bundle in a main scanning direction; and
   an optical scanning unit that focuses the third light bundle on a scanning surface to form an image.

2. The optical scanner according to claim 1, further comprising a driving circuit that drives the light source and is integral with the detector.

3. The optical scanner according to claim 1, wherein the splitter is a light reflecting member, a curved mirror having a positive focal power with respect to the second light bundle, or a light transmitting member.

4. The optical scanner according to claim 1, further comprising an optical element with a focal length between the light source and the splitter, wherein the splitter is located near a rear focal point of the optical element in an optical axis direction of the optical element.

5. The optical scanner according to claim 1, wherein the light source is a vertical cavity surface emitting laser.

6. The optical scanner according to claim 1, further comprising:
   a beam shaper that includes an aperture to shape light beams emitted from the light source system.

7. The optical scanner according to claim 1, wherein the splitter is arranged such that the second light bundle and the third light bundle form an angle only in a plane substantially perpendicular to a direction along which a smaller one of a main-scanning direction width and a sub-scanning direction width of an aperture of a beam shaper extends.

8. The optical scanner according to claim 1, wherein the splitter splits the first light bundle such that the second light bundle and the third light bundle form an angle in a plane parallel to a sub-scanning plane that is perpendicular to a main scanning plane.

9. The optical scanner according to claim 8, wherein the splitter splits the first light bundle into the third light bundle that passes through an aperture of a beam shaper and the second light bundle that surrounds the third light bundle.

10. The optical scanner according to claim 8, wherein the splitter is adjacent to one side of the aperture in a sub-scanning direction.

11. The optical scanner according to claim 1, wherein an aperture of a beam shaper is integral with the splitter.

12. The optical scanner according to claim 11, wherein the splitter splits the first light bundle into the third light bundle that passes through the aperture and the second light bundle that surrounds the third light bundle.

13. The optical scanner according to claim 11, wherein the splitter is adjacent to one side of the aperture in a sub-scanning direction.

14. The optical scanner according to claim 1, wherein
   an aperture of a beam shaper and the splitter are separate in a traveling direction of the light beams; and
   the splitter is located upstream from the aperture.

15. The optical scanner according to claim 14, wherein the splitter splits the first light bundle into the third light bundle that passes through the aperture and the second light bundle that surrounds the third light bundle.

16. The optical scanner according to claim 14, wherein the splitter is adjacent to one side of the aperture in a sub-scanning direction.

17. The optical scanner according to claim 6, wherein the light source is a vertical cavity surface emitting laser.

18. The optical scanner according to claim 17, wherein
   the beam shaper includes an optical element with a focal length between the light source and the splitter, and
   the splitter is located near a rear focal point of the optical element in an optical axis direction of the optical element.

19. The optical scanner according to claim 1, wherein the second light bundle is distributed around the third light bundle at a position of the splitter.

20. The optical scanner according to claim 1, wherein the detector detects a light intensity of the second light bundle.

21. The optical scanner according to claim 20, wherein light intensity of light beams emitted from the at least one light source is controlled based on the light intensity detected by the detector.

22. An optical scanning method, comprising:
   shaping a plurality of light beams using a light-amount control method for controlling an amount of light from at least one light source in an optical scanner, the light-amount control method comprising:
      detecting, by a detector, light intensity of a first light bundle emitted from the light source;
      splitting the first light bundle into at least a second light bundle and a third light bundle such that a light component at a peak of the light intensity in a plane perpendicular to a propagation direction of the first light bundle is included only in the third light bundle; and
      guiding the second light bundle to the detector;
   deflecting, by a deflector, the shaped light beams for scanning in a main scanning direction; and
   with an optical scanning unit, focusing the deflected light beams on a scanning surface to form an image.

23. The optical scanning method according to claim 22, wherein the second light bundle is distributed around the third light bundle at a position where the splitting is performed.

24. An image forming apparatus comprising an optical scanner that includes:
   a light source system that includes at least one light source;
   a beam shaper that includes an aperture to shape light beams emitted from the light source system;
   a deflector that deflects and scans the light beams in a main scanning direction; and
   an optical scanning unit that focuses the light beams on a scanning surface to form an image, wherein the light source system includes
   a splitter that splits a first light bundle emitted from the at least one light source into at least a second light bundle and a third light bundle such that a light component at a peak of a light intensity in a plane perpendicular to a propagation direction of the first light bundle is included only in the third light bundle; and a detector that receives the second light bundle; and an optical detecting system that guides the second light bundle to the detector.

25. The image forming apparatus according to claim 24, wherein the second light bundle is distributed around the third light bundle at a position of the splitter.

* * * * *